United States Patent
Shapiro et al.

(10) Patent No.: US 6,607,207 B2
(45) Date of Patent: Aug. 19, 2003

(54) WHEELED PERSONAL MOBILITY DEVICES WITH COLLAPSIBLE WHEEL AXLE ASSEMBLIES AND INTEGRATED STEERING AND PROPULSION LINKAGES

(76) Inventors: Richard N. Shapiro, 2248 Haversham Close, Virgina Beach, VA (US) 23464; Philip A. Gurecki, 4855 Braden Crescent, Norfolk, VA (US) 23502

(*) Notice: Subject to any disclaimer, the term of this patent is extended or adjusted under 35 U.S.C. 154(b) by 0 days.

(21) Appl. No.: 09/848,334

(22) Filed: May 4, 2001

(65) Prior Publication Data

US 2002/0163164 A1 Nov. 7, 2002

(51) Int. Cl.$^7$ .............................. B62K 15/00
(52) U.S. Cl. ................ 280/287; 280/39; 280/261
(58) Field of Search ...................... 280/30, 38, 39, 280/47.47, 204, 401, 641–644, 646, 651, 278, 639, 261, 287; 180/89.1, 313, 315, 348; 296/185

(56) References Cited

U.S. PATENT DOCUMENTS

| | | | | |
|---|---|---|---|---|
| 2,879,072 A | * | 3/1959 | Rear | 280/40 |
| 2,975,850 A | * | 3/1961 | Dolphin | 180/313 |
| 5,186,482 A | | 2/1993 | Sapper | 280/278 |
| 6,152,473 A | | 11/2000 | Shih | 280/278 |

* cited by examiner

Primary Examiner—Jack Lavinder
Assistant Examiner—Bradley T King
(74) Attorney, Agent, or Firm—Larson & Taylor, PLC

(57) ABSTRACT

Wheeled personal mobility vehicles with extremely thin stowed profiles are provided, which in one embodiment, include a plurality of movable, collapsible wheel axle assemblies which are supported on a support frame and movable between an operative state where the wheels provide rolling support, and a collapsed state where the wheels are moved into the side elevational profile of the device. The embodiment provides for both integrated propulsion and steering linkage to the wheels when they are manually moved into their operative position, along with a collapsible steering mechanism, a support base and at least one collapsible seat. This embodiment may also provide for pedal power, battery, fuel cell or motive power as well as remote control operation. Several alternative pedal or motive power, wheeled devices and tricycles collapse all parts into a thin, side elevational profile, and one alternative "tricycle" embodiment includes a multiple jointed "A-frame" embodiment incorporating folding handlebars as well as movable wheel axle assemblies which parts all fold into two or more parallel planes to provide for extremely thin, compact storage and/or transport. Various embodiments may include unique multi-function folding pedals which may be manipulated to provide for selective changing of gears, glide mode, as well as friction braking.

44 Claims, 21 Drawing Sheets

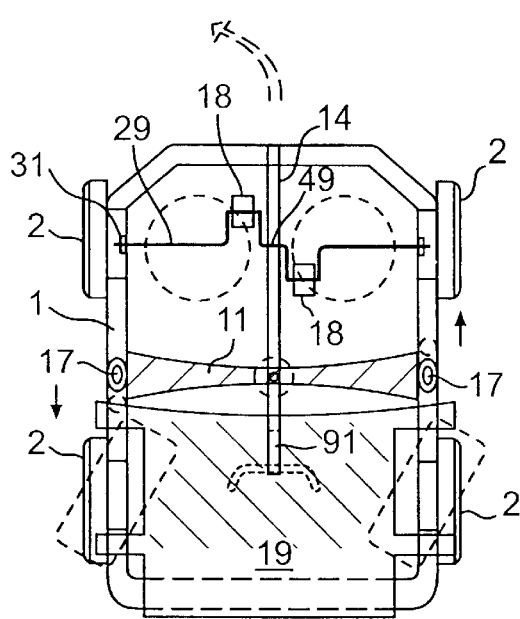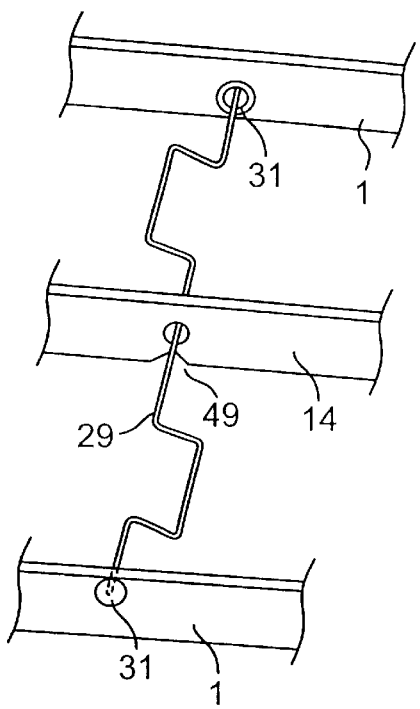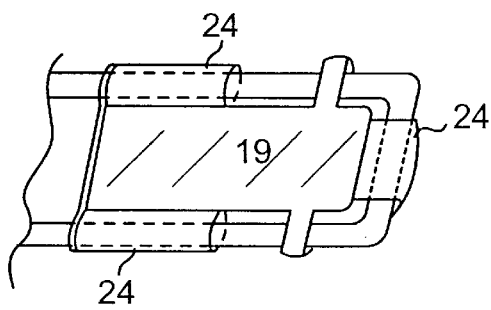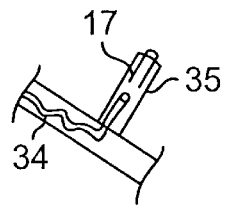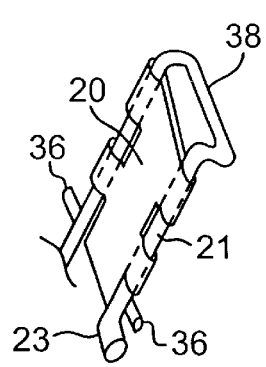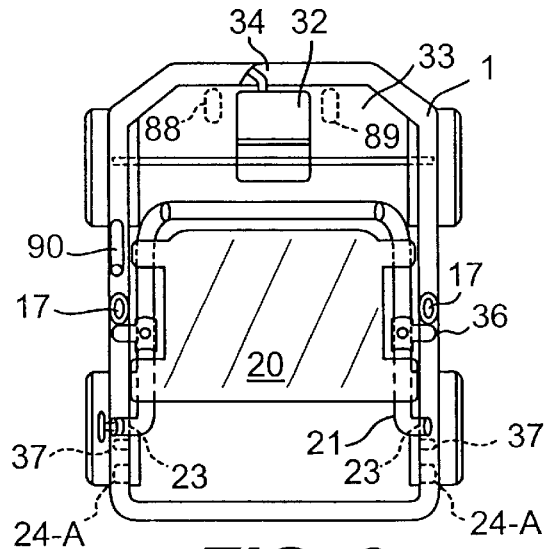

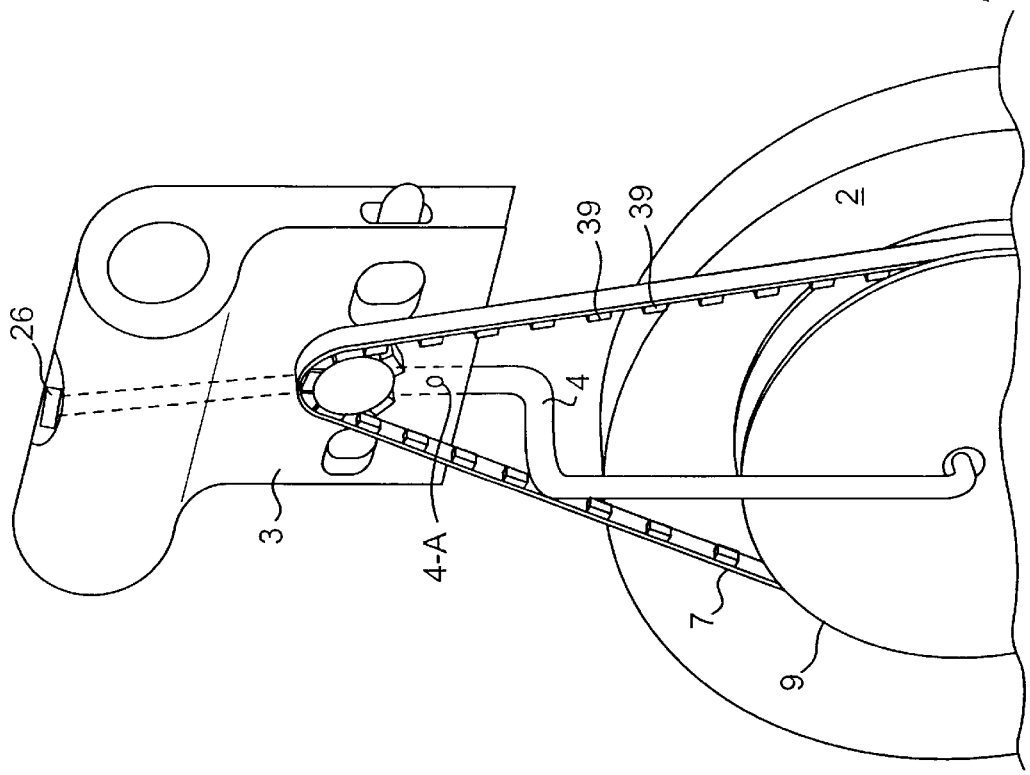
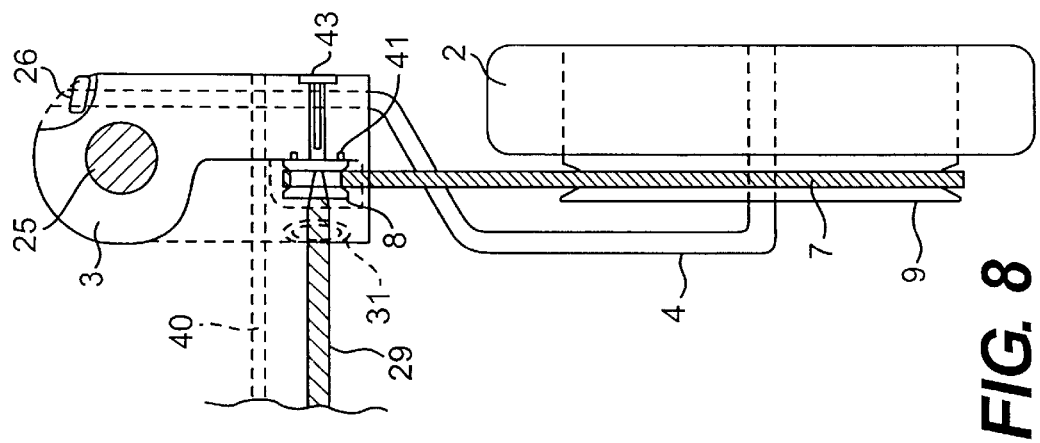

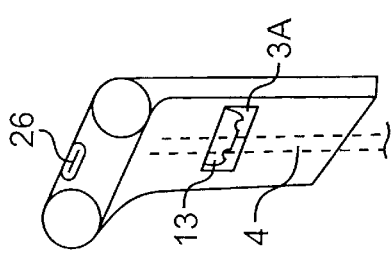
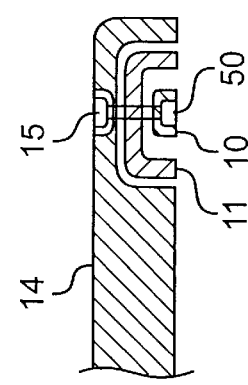
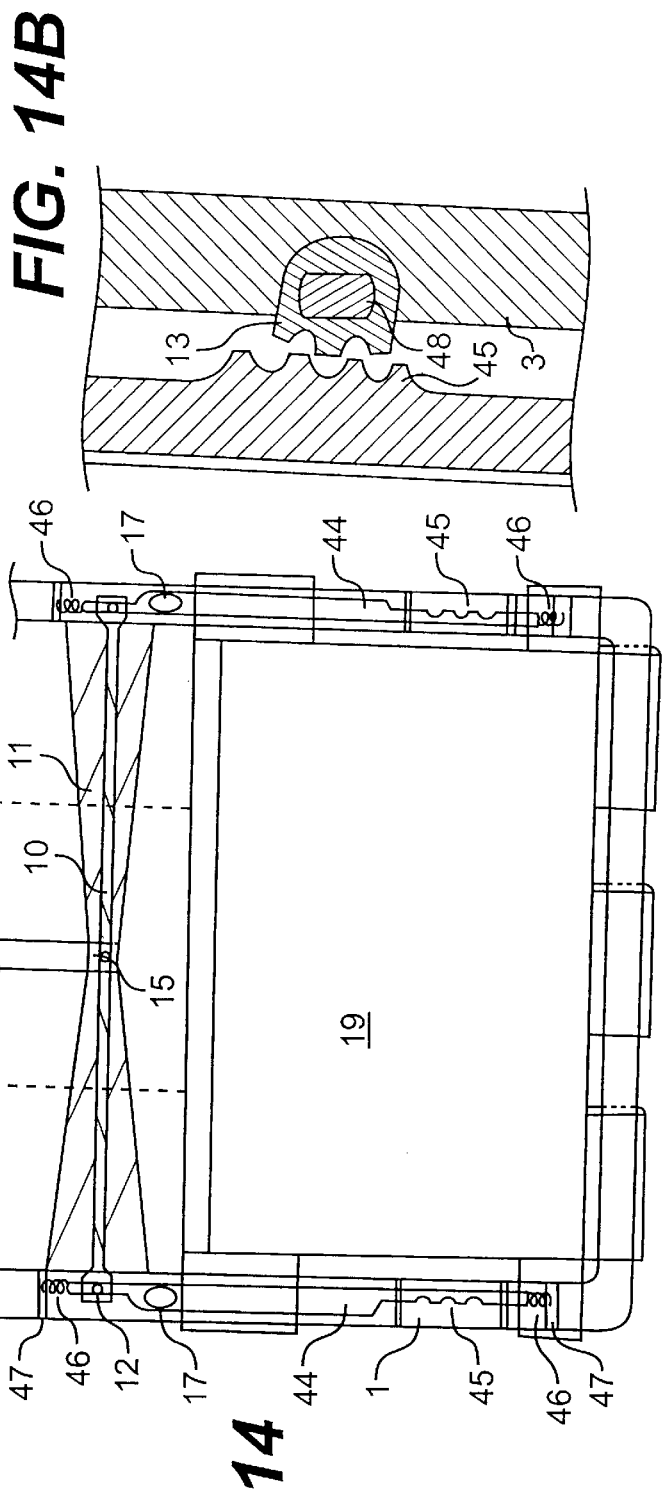
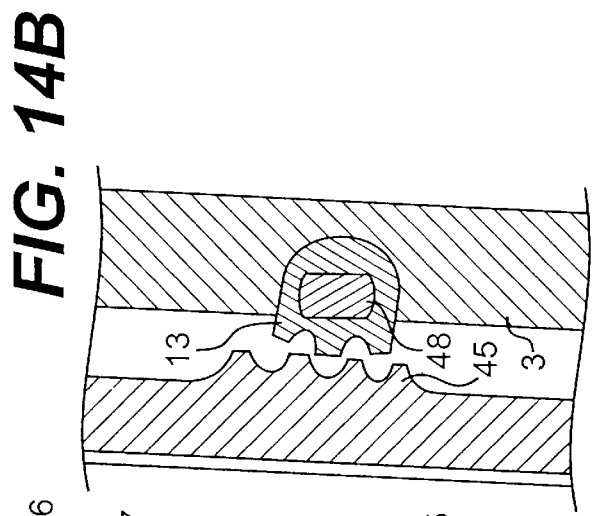

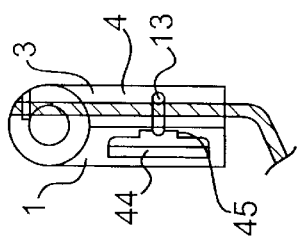
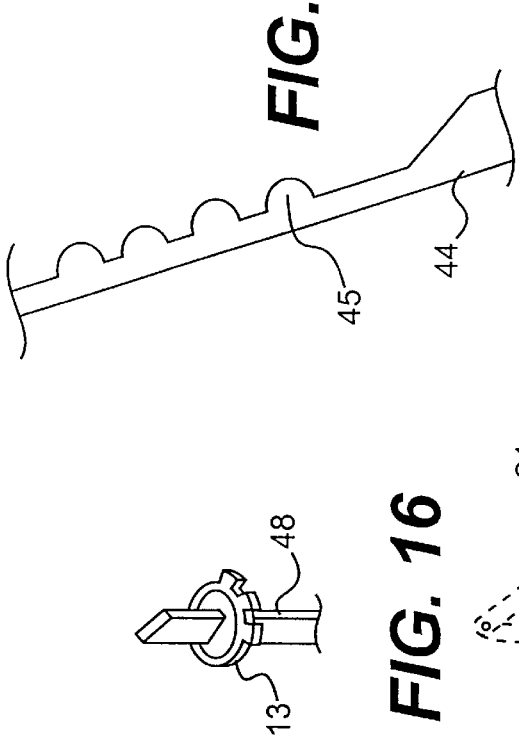
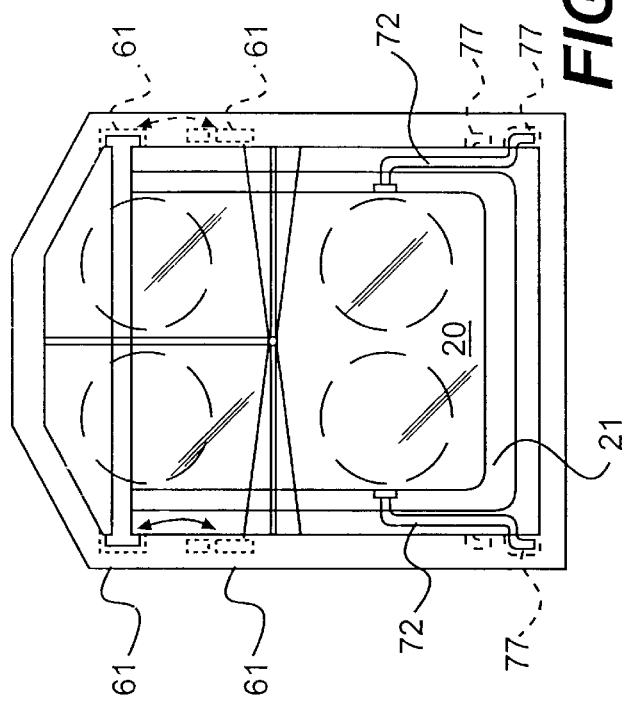
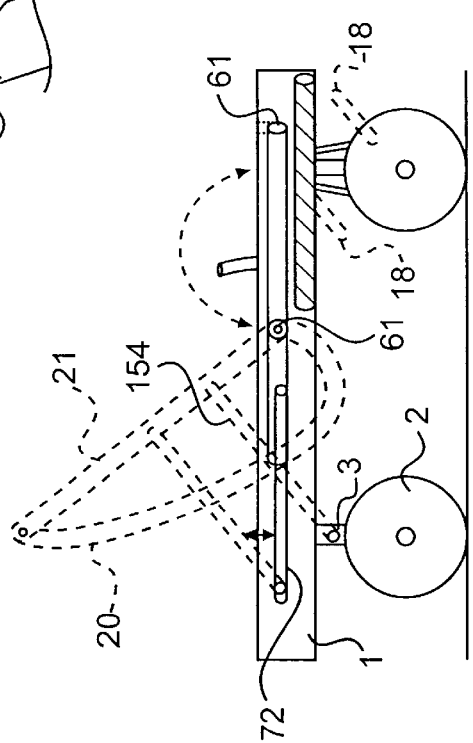

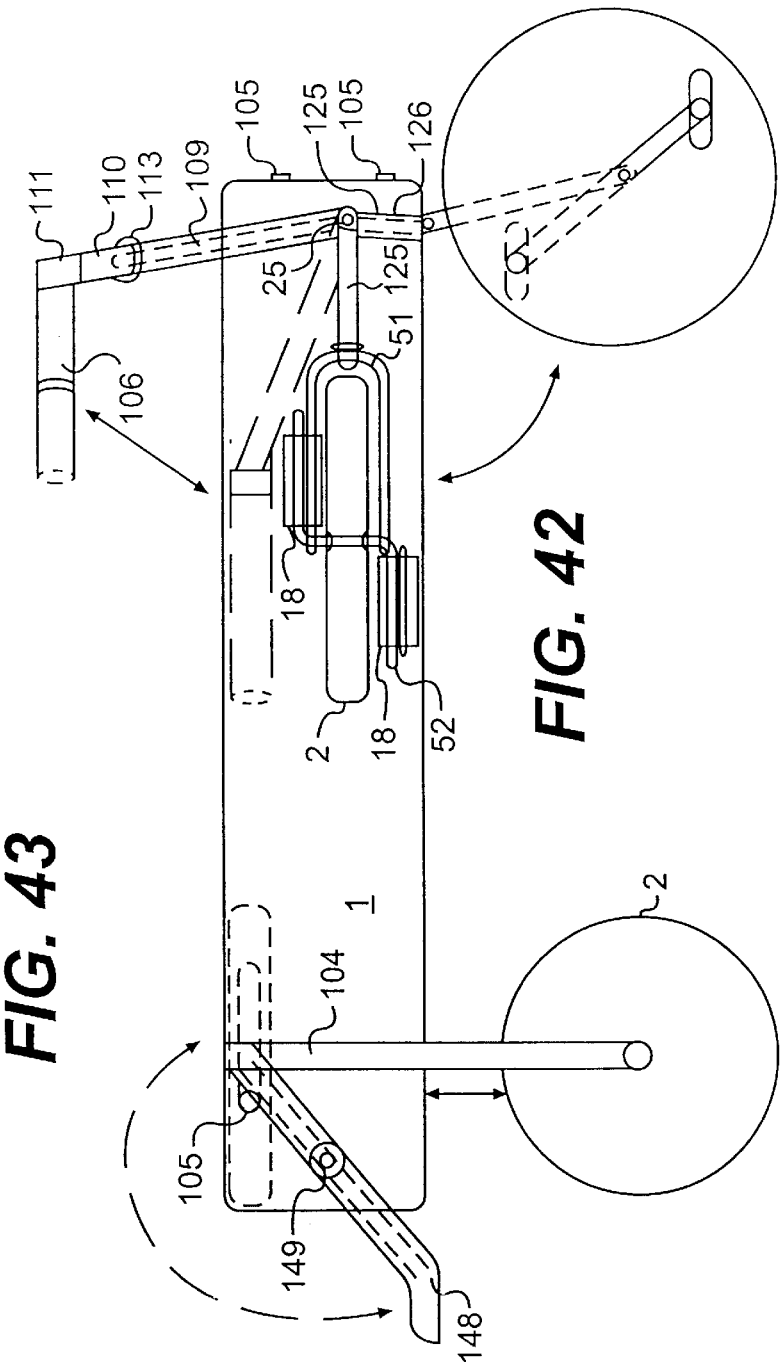
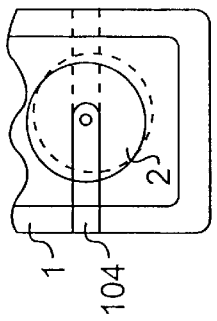
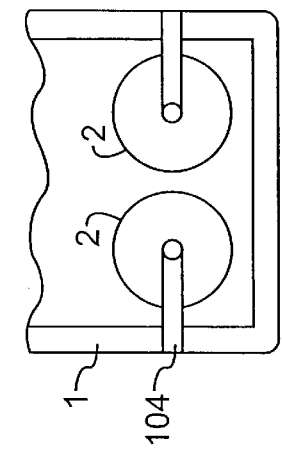
FIG. 44
FIG. 43
FIG. 42

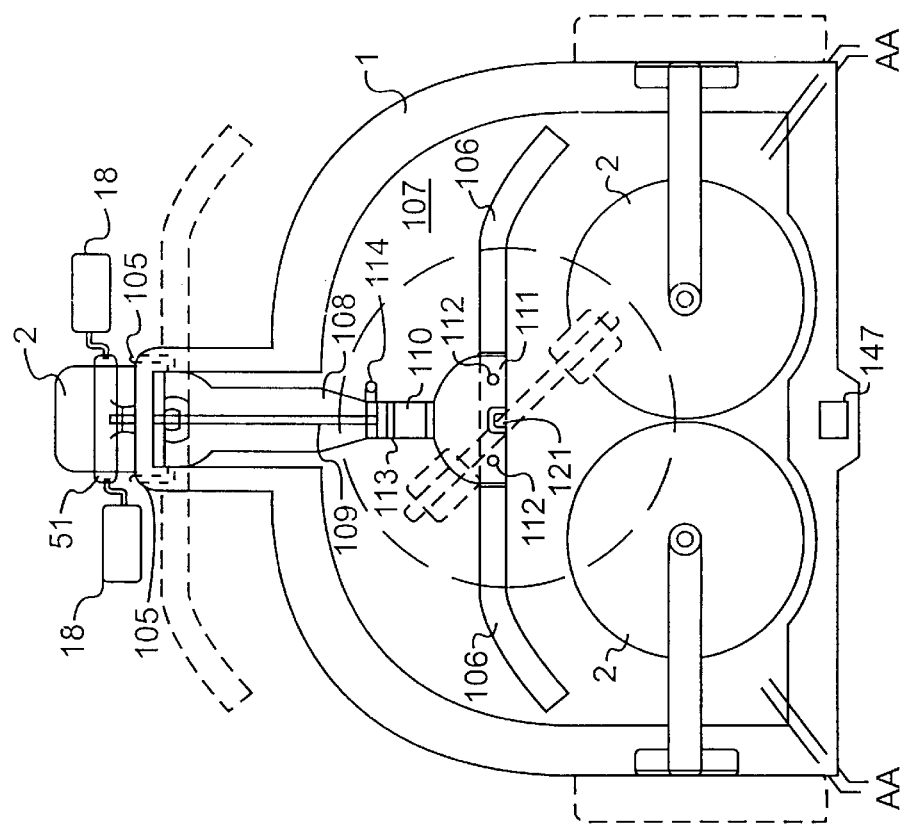
FIG. 45
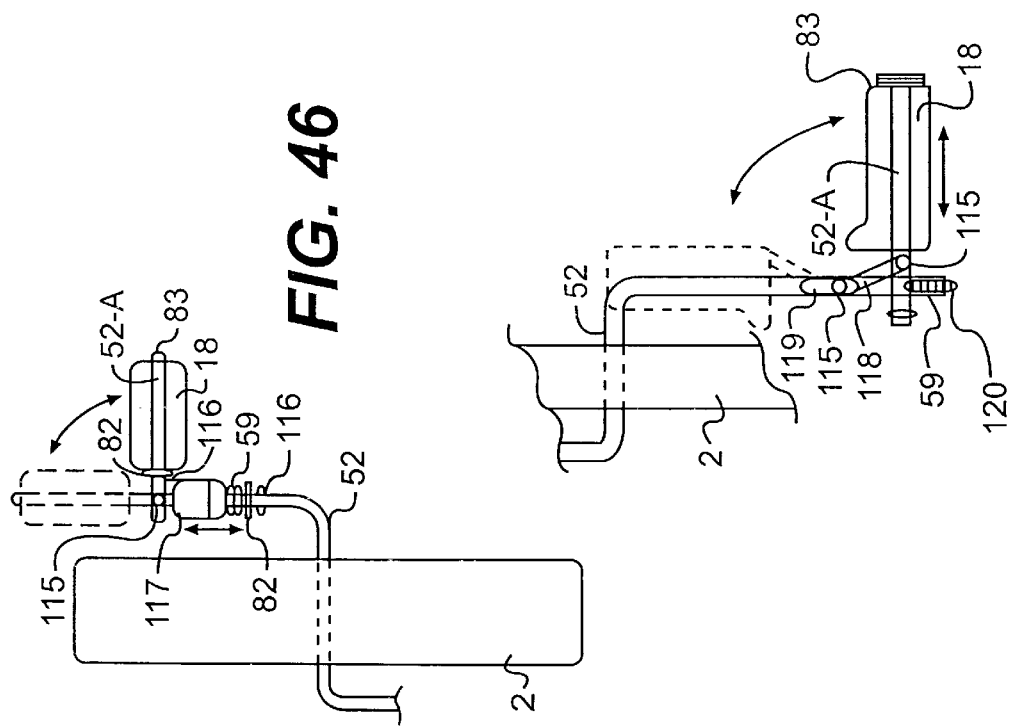
FIG. 46
FIG. 47

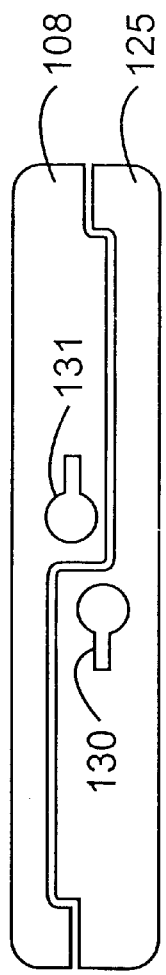
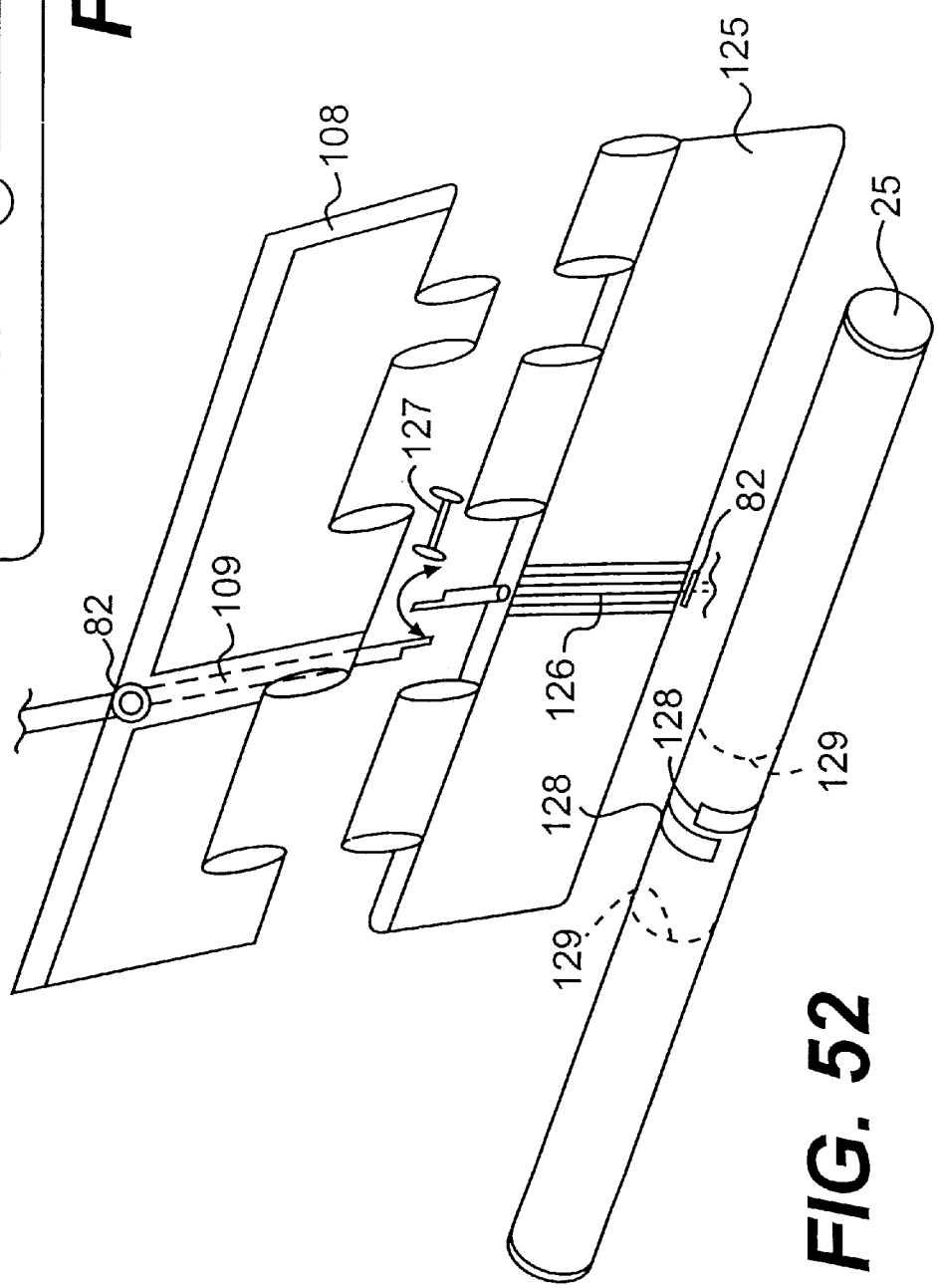

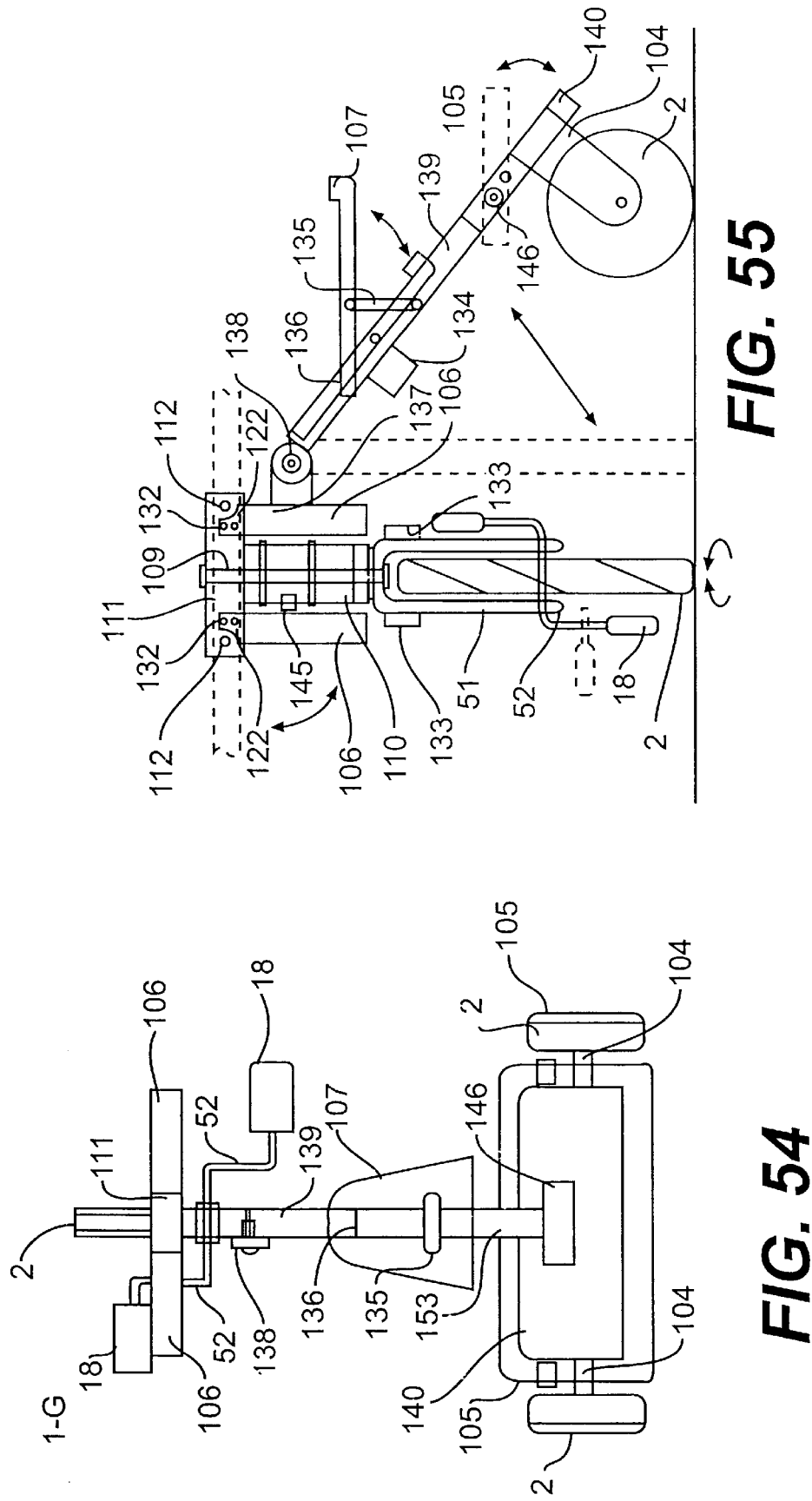

WHEELED PERSONAL MOBILITY DEVICES WITH COLLAPSIBLE WHEEL AXLE ASSEMBLIES AND INTEGRATED STEERING AND PROPULSION LINKAGES

RELATIONSHIP TO OTHER APPLICATIONS

Co-inventor Shapiro's previous U.S. application Ser. No. 09/271,274 filed on Mar. 17, 1999, as well as Shapiro's continuation-in-part U.S. patent application Ser. No. 09/604,769, filed on Jun. 28, 2000.

FIELD OF THE INVENTION

The present invention relates to wheeled personal mobility devices, pedal or motive powered cycles and "go-carts", tricycles, recumbent cycles, and more particularly to unique attributes which allow for selective folding of such transportation vehicles to a very thin profile.

BACKGROUND OF THE INVENTION

Consumers have an ever-growing desire for compact and durable space-saving personal mobility wheeled devices. Co-inventor Shapiro disclosed pivoting wheel axle assemblies and other novel collapsible components for wheeled devices in previous U.S. application Ser. No. 09/271,274, now U.S. Pat. No. 6,220,611, as well as continuation in part U.S. patent application Ser. No. 09/604,769. The disclosures herein grow out of the effort to create a variety of collapsing transportation vehicles and user-propelled wheeled devices which may be folded to an extremely thin profile, which generally incorporate steering and drive or pedal linkages for wheeled carts and cycles, pedal and motive-powered type cycles, recumbent bikes, "go-carts" and the like.

A number of practical problems in the prior art have prevented creation of an ultra-thin wheeled, personal mobility vehicle offering steering. The prior art is replete with obstacles relating to creating a very thin collapsed profile, yet still providing for steering and/or motive propulsion linkage to the wheels for the device.

The inventions here provide for collapsing three, four or more wheel devices, whether pedal-powered or motor/battery-powered, which set up in seconds, which include no part which normally detaches, which are very simple to collapse or place in the operative position, yet all function equally as well as other comparable non-collapsible products, with the advantage of easy, flat, storage and convenient transport.

Objects of the invention include the following: to provide movable and/or unique 270, 180 or 90 degree pivoting wheel axle and wheel support assemblies which may be specially equipped with means that allow a propulsion or pedal shaft link to the wheel when the wheel axle assembly is moved or pivoted into the operative position by virtue of a propulsion transfer gear and a propulsion linkage means, such as a belt or gears, mounted on the movable or pivoting wheel axle assembly itself, whereby the movable or pivoting wheel axle assembly is moved or pivoted into the operative position and the propulsion or pedal shaft/axle automatically links with the wheel assembly, and to alternatively provide for multiple gears mounted on the said wheel axle assembly which permit for multiple gear ratios, to disengage from the gear, e.g., to allow a glide mode when pedal power or motive power is provided.

Another object of the invention is to provide for a 270, 180 or 90 degree movable or pivoting axle assembly which is equipped with a steering gear within the movable or pivoting wheel axle assembly, which becomes operative when the wheel axle assembly is moved or pivoted into the operative position whereby a steering linkage is automatically engaged with the steering gear portion of the wheel axle assembly, to provide that all of these wheel axle assemblies automatically or positively lock in the storage position when collapsed within or nearly within the side elevational profile of the device. The wheel axle assemblies also provide that the same finger latch or latches which provide for the positive latching in the collapsed position also double as the finger latch access points which also, once the wheel assembly is moved or pivoted, serve to lock or positively latch the wheel assembly in the operative or engaged position when in use;

It is a further object of the invention to provide a transverse steering strut, or, alternatively for a bowtie-shaped cable or rigid bands which serve to stabilize bilateral steering of a plurality of wheels of the device via the "joy sticks" or traditional steering wheel or handlebars, to also provide a cover or housing for the transverse steering strut, which also doubles as a cart frame support, and to also provide for a generally longitudinal support for the cart frame which also may support the drive axle when pedal drive is provided;

It is a further object of the invention to provide for multiple alternative methods of providing one or more seat bottoms or seat back or seat frames for each or any of the collapsible wheeled devices, which may include rigid or fixed seat bottoms or seat backs, as well as flexible material or fabric seat bottoms and backs which may be selectively manually manipulable by the user forward and backward depending on the size of the user, as well as to provide for a number of alternative embodiments relating to collapsibility of the bottom and back of the seat, or to allow the seat frame to be selectively manipulable along the support frame. Also, the seat frame may include a fold-out or pivotable wheel support brace which may be interfitted between a tandem set of movable wheel assemblies in their operative position.

A further object of the invention is to provide for a unique "joy stick" steering component which provides that one or more steering joy sticks collapse within the general profile of the cart frame, but which, when activated, are moved or pivoted into an operative position, and movement of such joy sticks provides for the steering of the wheeled device based on the joy stick being incorporated into a further steering linkage component, and additionally said joy stick or steering component may be altered to include means whereby a button, squeeze or manipulation of said joy stick provides for power to the wheeled device when a battery or motor is utilized and is further provided that a friction style brake may be incorporated into the overall design. Alternatively, traditional steering columns which collapse are disclosed.

It is an object of the invention to incorporate battery power or other motive power means into the embodiments disclosed, and to provide for wireless remote control of such steering or motive power on any or all of the embodiments disclosed herein, wireless remote control of equipment mounted on such wheeled devices, including, but not limited to camera or imaging equipment, or miscellaneous recording and measuring apparatus, whether such devices are miniaturized or not, yet still providing for an extremely thin collapsed profile.

In a further embodiment of the invention, a three-wheeled device is disclosed which includes unique methods whereby the forward or rear wheel axle assembly collapses within the side elevational profile of the device, and additionally a wheel internal hub is provided which allows for direct pedal power, gliding mode, friction brake, and multiple gears, all within said internal wheel hub which modes may be selected and controlled by a unique lateral movement of the pedal, or by reverse or lack of pedal motion, and yet another embodiment of the three-wheeled device which provides for a second forward offset wheel sprocket equipped with pedals which pedals also allow for gear shifting which is effected by forceful lateral movement on one of the pedals of the pedal sprocket which thereby changes the gearing within the internal hub of one of the forward wheels, depending on whether a second offset sprocket is used, or a single forward wheel is employed.

It is another object of the invention to provide for a unique hideaway safety flag which is incorporated along or inside the rear of the seat design, as well as for a general cargo storage bag incorporated and collapsible into the seat back design. Further, the three-wheeled device also provides for a unique method of moving or pivoting the fork or frame of the forward wheel via the use of a pin or cam structure to allow the forward wheel and its brace to be pivoted into the same plane of the overall cart frame prior to or after the wheel is moved or pivoted to align it into the cart frame side elevational profile for collapsing purposes.

It is a further object of the invention to provide for several embodiments of collapsible tricycles, one which includes a design where the collapsing steering and forward wheel structures share a common support joint and each structure includes at least one latch control which locks and releases said structures for movement or pivoting of these structures in both the operative and collapsed position within the side elevational profile of the device frame and also provides said steering and forward wheels each incorporate an internal axle or steering control rod which is joined with a common pin, within the periphery area of the common support, and which overall design allows said rods to pivot and collapse, yet interact as one steering column unit in the operative position to provide steering control of said forward wheel. Also, the handlebar is movable to achieve a collapsed profile.

In a second tricycle "A Frame" collapsing design embodiment a joint is provided along two ends of the central frame supporting the seat, and the central frame and rear wheel frame may each pivot and collapse in close parallel proximity to the steering column and forward wheel, and may resiliently latch together, and also the pivoting central frame may alternatively rotate, as well as pivot, so that said pivoting A frame may rotate 180° to achieve a suitable thinner overall collapsed profile if desired. Another collapsing handlebar design is also included.

A further object of the invention is to provide multiple methods to pivot and collapse the pedals 90° along the pedal post to a profile parallel with the wheel to which the pedal is normally joined, as well as to provide for a pivot point where the device "A-Frame" meets the rear wheel structure so that both pivot into a common plane, and further to alternatively provide for a pivoting and/or fold-out foot step or ledge at the rear of the device, which folds into the device's side elevational profile for collapsed storage.

It is a further object of the invention to provide that all of the disclosed transportation vehicles, whether constructed for single or multiple occupants, are designed to achieve a flat profile for easy transport and storage, including the means that allow all wheels to positively latch in a storage position within the side elevational profile of the device frame, whether using a 90, 180 or 270 degree movable and pivoting wheel axle assembly, and to provide that all other features, E.g., pedals, battery, motor, seat bottom and back, joy sticks, handlebars or steering handles, etc. all collapse within the side elevational profile of the wheeled device as well.

BRIEF DESCRIPTION OF THE DRAWINGS

FIG. 4 is a top plan view of the cart of FIG. 1 with wheels in operative position, including certain attributes of the embodiment, omitting certain others;

FIG. 4-A is a simplified perspective of the drive axle components of the embodiment of FIG. 4;

FIG. 5 is a top plan view omitting aspects of the embodiment of FIG. 4;

FIG. 6 is a top plan view of an alternative embodiment of the cart 1-A, providing for a motor or battery power and one particular seat back arrangement;

FIG. 6-A is a broken away, simplified perspective of an alternative joy stick or steering component arrangement;

FIG. 7 is a simplified detached perspective of a view of the seat back. frame of FIG. 6;

FIG. 8 is a longitudinal cross-section view of the drive shaft linkage of the forward wheel assemblies of FIG. 4;

FIG. 9 is a detached perspective view of a wheel and pivoting wheel assembly of FIG. 8;

FIG. 14 is a top plan view, partially broken away, of the embodiment of FIG. 1, omitting certain features, partially in section;

FIG. 14-A is a transverse cross-section view, partially broken away, of the steering strut and center support of embodiment of FIG. 14;

FIG. 14-B is a top plan view, partially broken away, of the steering gear and the associated steering linkage;

FIG. 15 is a detached perspective of the steering gear component of the pivoting wheel assembly of the embodiment of FIG. 1;

FIG. 16 is a simplified broken away perspective of the shaped axle and steering gear of FIG. 15;

FIG. 17 is a detached, partially broken away perspective of the steering linkage of the embodiment of FIG. 14;

FIG. 18 is a longitudinal cross-section view of the pivoting wheel assembly and steering linkage components of FIGS. 14–17;

FIG. 19 is a side elevational view of the four-wheel cart with alternative seat and seat support components;

FIG. 20 is a top plan view of the embodiment of FIG. 19, with further selected details shown;

FIG. 42 is a side elevational view of the three-wheel tricycle denoted 1-F;

FIG. 43 is a top plan view of the rear wheels of the same cart;

FIG. 44 is a top plan view of an alternative embodiment of the rear wheels of the tricycle 1-F where they are sandwiched atop each other;

FIG. 45 is a top plan view showing the relationship of the rear wheels, collapsed steering column, as well as front wheel of tricycle 1-F;

FIG. 46 is an end elevational simplified profile of the front wheel and one pedal of the tricycle 1-F;

FIG. 47 is an end elevational view of one pedal post of the front wheel of tricycle 1-F showing an alternative folding pedal design;

FIG. 52 is an exploded, simplified perspective of the pivoting wheel and steering column assemblies of tricycle 1-F;

FIG. 53 is a detached, simplified detailed perspective of the collapsed wheel and steering and column assemblies of tricycle 1-F;

FIG. 54 is a top plan view of tricycle 1-G featuring an A-frame pivoting and collapsing section, shown in a completely operative position;

FIG. 55 is a side elevational profile of tricycle with an A-frame pivoting and collapsing section which shows the A-frame and the folded position;

DESCRIPTION OF THE PREFERRED EMBODIMENTS

Figure 1:
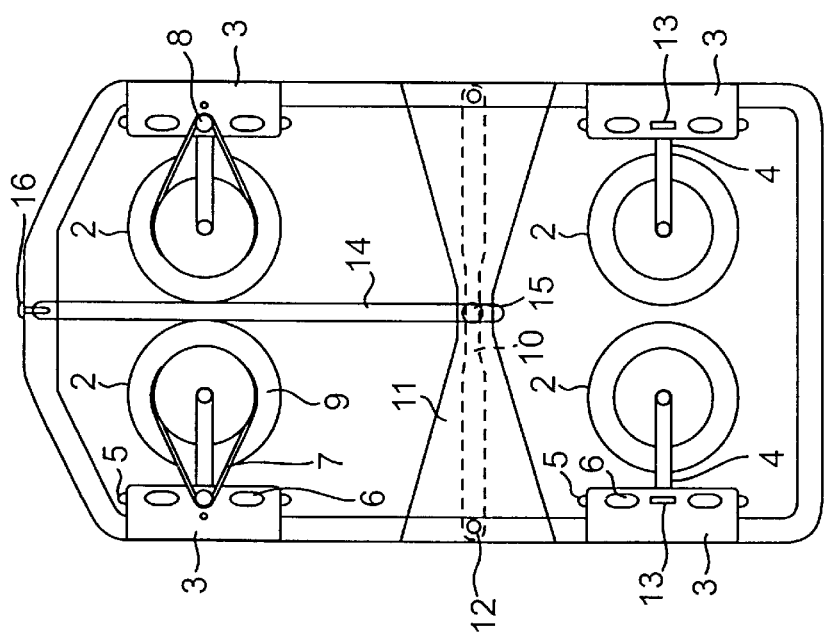
FIG. 1 is a top plan view of the first preferred embodiment of a four-wheel device of the invention, omitting certain aspects of this embodiment and is the suggested figure for the cover page of the patent.

Referring to the drawings, FIG. 1 shows a four-wheeled cart, generally denoted as 1-A in a collapsed state, omitting a number of components, including the pedal drive axle, and seat bottom or seat back. In this preferred embodiment, the cart device has an anticipated thickness of about the length of a credit card or thinner, and includes a cart frame, denoted 1, which comprises the periphery, four wheels 2, and four pivoting wheel axle assemblies, 3. Each of the four pivoting wheel assemblies, 3, are similarly equipped with dual finger latches which are spring-loaded inside each of the pivoting wheel assemblies. Finger latches, 5, are mounted within finger latch access recesses, 6, fabricated within the pivoting wheel assemblies, 3. Alternatively, a single latch may be employed and the latch may be inside the wheel assembly, or situated outside the wheel assembly, within the cart frame adjacent the pivoting wheel assembly. In each of the pivoting wheel assemblies, 3, a suitable wheel axle, 4, travels through the center of the wheel, 2, and also travels through a matching opening in pivoting wheel axle assembly 3, as is more clearly seen in FIG. 3, and the axle, 4, terminates with a nut or cap, 26, also seen in FIG. 3.

Figure 3:
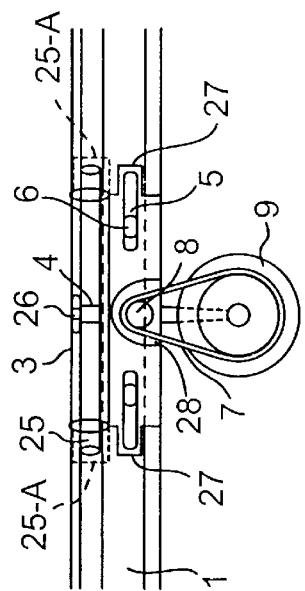
FIG. 3 is a transverse cross-sectional view of one of the forward pivoting wheel axle assemblies of FIG. 1.

Referring further to FIG. 3 for a simplified perspective, the dual finger latches are spring-biased (springs not shown). In the operative position shown in FIG. 3, the latches are held firmly in corresponding finger latch receiving cavities, 27. The pivoting wheel assembly, 3, as shown in FIG. 3, is held in place and pivots by means of a cylindrical pivoting wheel assembly support portion or dowel, 25, which travels latitudinally through a matching opening in the pivoting wheel assembly 3, and is received in dual matching frame support cylinder receiving cavities, 25-A, or alternatively the wheel assembly, 3, and support portion or dowel, 25, may be of unitary fabrication. The wheel axle, 4, shown in FIG. 3, travels through the pivoting wheel assembly and terminates with a cap or nut, 26, shown in FIG. 3 also. A suitable portion of the support cylinder or dowel, 25, is cut away to provide for placement of the cap (not shown).

In FIGS. 1 and 3, several details of the forward two wheel assemblies are shown. The drive or propulsion gear, 8, is mounted to the wheel axle assembly, around which a drive belt, 7, is mounted, and this drive belt (which may instead comprise a chain) also extends around a matching wheel drive belt lip, track or sprocket, 9, included preferably on the interior facing side of the wheel (interior side when the wheel is oriented in the operative position) of FIG. 3. Alternatively, rather than employ a belt 7, a plurality of gears may link the drive or propulsion gear 8 and any shaped, rotating portion of the wheel 2 (not shown). FIG. 1 does not show the drive axle which interacts with the drive gear, 8, as further described below. FIG. 3 shows full detail of the drive gear, 8, drive belt, 7, and wheel drive belt, 9.

Referring to FIG. 1, the rear two pivoting wheel assemblies are equipped with a steering gear, 13, which is mounted onto the wheel axle, 4, at a portion of the wheel axle which travels through the pivoting wheel assembly 3. By virtue of the operator of the device utilizing either of the dual joy sticks, 17, shown in FIG. 2, which moves the steering linkage (not shown) the operator controls the turning of the rear two wheels shown in FIG. 1. FIG. 1 also shows some detail of the transverse steering strut, 10, which serves to assure that both wheels turn simultaneously, and also shows the steering strut housing cover/frame support which overlies transverse steering strut, 10. A steering strut pivot bolt, 15, travels through the steering strut, 10, as well as the steering strut cover, 11. Also, at either end of the steering strut, 10, means are provided for a steering strut/linkage connector, 12, to connect the strut, 10, to the steering linkage itself, 44 (not shown here, shown in subsequent figures). Referring also to FIG. 1, there is a generally longitudinal center frame support, 14, generally parallel with the sides of the cart frame which connects between the steering strut/frame support, 11, and the forward portion of the cart frame, 1, which terminates with any suitable attachment to the frame, which may include central frame bolt, 16. The center frame support, 14, serves not only as a support, but may serve to support a drive axle or pedal drive axle shown in subsequent figures.

Figure 2:
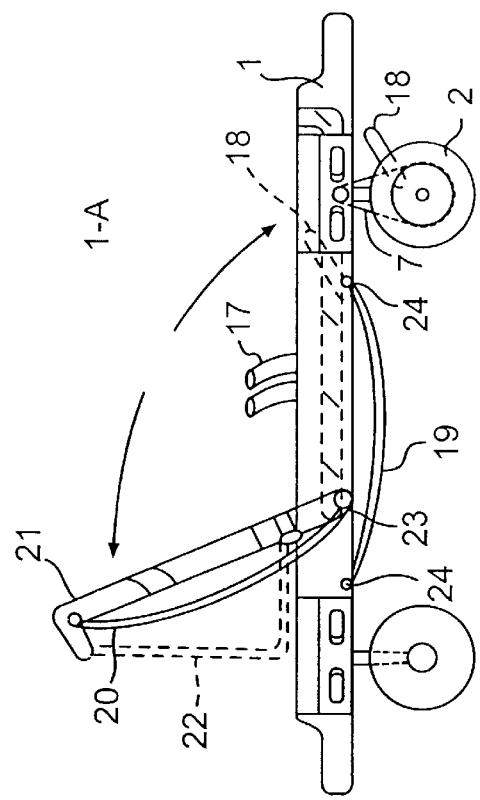
FIG. 2 is a side elevational view of the cart of FIG. 1.

Referring to FIG. 2, the same embodiment of the cart, 1-A is shown in the operative position with the addition of other details of the pedals 18 as well as the seat bottom and seat back. FIG. 2 indicates that instead of a solid cart base, a flexible fabric seat bottom, 19, may be employed which may be mounted across the cart frame, 1, in any suitable fashion. Seat bottom connectors, 24, may be fabric looped with Velcro, rope, fasteners, or the like. A variety of seat backs may be employed, and in FIG. 2, is shown a seat back frame, 21, to which a flexible fabric, 20, is connected in a suitable fashion, and the unit is affixed to the cart frame, 1, by virtue of a seat back frame connector, 23, which joins to the inner aspect of the cart frame, 1. A fabric mesh or suitable storage bag 22, may be mounted to the seat back frame 21 or instead to the inner aspect of the rear cart frame 1 (not shown). The entire seat back and frame, 21, pivots from the operative position shown in FIG. 2 to the storage position shown by ghost outline within the side elevational profile of cart frame, 1. Dual joy sticks, 17, are mounted to the cart frame on either side to allow the operator to steer the device. Further details of the collapsibility of the joy sticks, 17, is discussed later. FIG. 2 also includes a ghost outline of the two user pedals, 18, shown in more detail later, as well as a view of the drive belt, 7, on the forward wheels. As discussed further below, the front wheels are the drive wheels, the rear wheels are the steering wheels.

FIG. 4 offers further detail of the first preferred embodiment of cart 1-A. Each of the four wheels, 2, occupy the operative position, while a ghost outline of the forward wheels shows their storage position when pivoted 270" to their storage position generally within the car frame profile. Additionally, the pedal drive axle, 29, is shown along with foot pedals, 18. The drive axle is further supported as shown in FIG. 4 by traveling through a portion of the center frame support, 14, by resiliently passing through the center frame support axle cavity/opening, 49, shown in FIG. 4-A. Alternatively, but not shown, any suitable washer or slip-on sleeve may further support the drive axle, 29, at a connection point with center frame support, 14, shown in FIG. 4-A. Additionally, the drive axle, 29, terminates in either end of the cart frame, 1, and it is held in a firm fixed position by the drive axle frame receptor, 31. The receptor, 31, may take any suitable form, including a snap fit form, and/or may simply be formed within the inner aspect of the cart frame, 1. Referring to FIG. 4, the dual steering joy sticks, 17, are shown, although, again, the steering linkage, 44, is not shown but is described below and is located entirely within the cart frame, 1. FIG. 4 shows that to propel the four-wheel device in to a left turn as shown by the arrow, the operator pulls back on the left joy stick and pushes forward on the right side joy stick which turns each of the rear wheels as shown in the ghost outline. Also in FIG. 4, the center strut cover/frame support 11, is shown and one embodiment of a seat bottom, 19, is shown, although the seat back and seat back frame, 20 and 21 respectively, are omitted for this simplified view.

It is further anticipated that rather than have joy sticks mounted in the cart frame, any suitable collapsing steering assembly, 91, may be employed as shown in FIG. 4. The collapsing steering assembly may be mounted to the transverse steering strut 10 (not shown in FIG. 4) and may telescope or collapse, and the strut and collapsing steering column may instead by mounted at any position within the periphery of the support frame.

FIG. 5 shows the flexible fabric seat bottom of FIG. 4 in simplified detail, showing how the seat bottom, 19, may be connected by connectors 24, as shown, or by Velcro loop, snaps, or rope (all not shown).

FIG. 6 is a top plan view of the four-wheeled cart with the wheels in the operative position, however, features the embodiment with battery or motor power rather than pedals, and also for illustration simplicity includes a seat back while omitting the seat bottom. A motor drive axle is shown at 33, which terminates at either side of the cart frame, 1, and has a linkage connection to the pivoting wheel axle assembly 3 at the drive gear, 8, described elsewhere. Any suitable motor or battery system is mounted as shown at 32 for illustration only, as the battery or motor may be mounted or affixed to any portion of the cart frame or a cart base and may even be incorporated into the cart frame itself (not shown). A power or electrical line, 34, is shown in part detail traveling from the motor or battery into the frame where it may be connected to either joy stick, 17, to provide for power control in the joy stick, 17, as shown in FIG. 6-A by squeeze pressure or push button. Alternatively, referring back to FIG. 6, an accelerator pedal is shown at 89, a customary brake pedal shown at 88 and/or a hand brake 90, may be employed mounted to the cart frame or any other location of the device, whereby the operator may manipulate it and establish friction upon any of the wheels in any customary manner.

Referring to both FIGS. 6 and 7, detail is shown on one embodiment of a seat back, 20, which is preferably constructed of a flexible fabric which is mounted to the seat back frame, 21. Seat frame, 21, interfits with the inner aspect of the cart frame, 1, by virtue of the seat frame connector, 23, shown in FIG. 6. The seat back simply pivots into the side elevational profile of the cart frame and may be raised by the user by pulling upward on the seat back frame formed handle, 38, shown in FIG. 7 more clearly. When the seat back frame, 21, is lifted to the operative position, its rearward operative tilt is stopped by virtue of dual seat back frame stops, 36, which may merely contact the cart frame, 1, or may resiliently be held in matching cart frame receiving cavities, 37, as shown in FIG. 6. The seat back frame connectors, 23, may simply resiliently hold in the inner aspect of the cart frame or may instead be held in position by screwing bolts which are manually manipulable by the user from the outer portion of the cart frame (not shown). Further, the seat back frame may have multiple selectable positions along the inner aspect of the cart frame, 24-A, as shown in FIG. 6, to provide for movement of the seat back to accommodate difference height operators.

Figure 10:
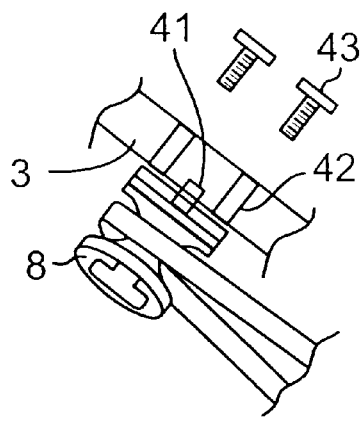
FIG. 10 is a longitudinal cross-section perspective of the drive gear and belt components of FIG. 8.
Figure 11:
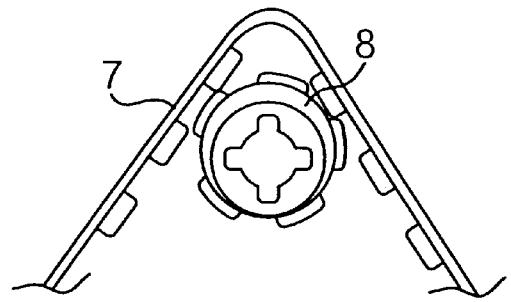
FIG. 11 is a transverse, simplified perspective of the drive gear and belt of FIG. 8.
Figure 12:
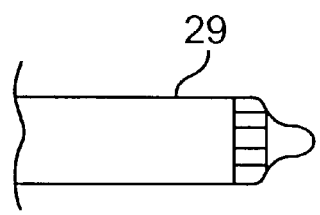
FIG. 12 is a side elevational perspective, partly broken away, of the drive axle of FIG. 8.
Figure 13:
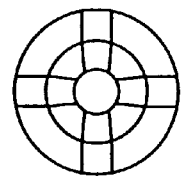
FIG. 13 is a side elevational detached perspective of one end of a drive axle of FIG. 8.

FIGS. 8–13 refer to specific details of the drive shaft and drive gear linkage system of the device and the pivoting wheel assemblies. Referring first to FIG. 8, is seen a cross-section of a pivoting wheel assembly, 3, a support cylinder or dowel, 25, the wheel axle, 4, as well as a wheel, 2, with drive belt track or lip 9. In FIG. 8, the drive axle, 29, is shown when the wheel assembly 3 is pivoted into this operative position shown, the axle links inside the drive gear, 8. The drive belt, 7, resiliently interfits around the drive gear, 8, and around a wheel drive belt lip, 9, all shown in FIG. 8. An optional drive axle cover or cart frame base, 40, is shown in dashed lines and a drive axle frame receptor, 31, is shown, each of which may be optional depending upon construction techniques. FIG. 11 shows the drive gear and the drive belts, 7. FIG. 11 also indicates that the drive gear, 8, and belt, 7, may have an interlocking tooth or protrusion and recess arrangement, although this may be entirely eliminated in favor of smooth surfaces or a chain and sprocket arrangement. FIG. 12 shows detail of one end or terminal point of the drive shaft and how there is a rounded, shaped nose which flares into a series of raised protrusions that surround the circumference of the axle as shown in FIG. 13, although any suitable arrangement of interlocking shapes may be employed linking the axle 29 and the gear 8. FIG. 10 focuses on the details of how the drive gear is mounted onto the pivoting wheel assembly, 3. Though any suitable anchoring method may be utilized, in the preferred embodiment shown, one or more inside threaded bolt portions, 42 of the gear 8 travel through matching cavities in the pivoting wheel assembly, 3, and are secured with drive gear retention screws, 43. One or more small drive gear stabilizing notches, 41, may protrude from the gear 8 base on the side mating with the pivoting wheel assembly 3. Although a simple single drive gear 8, is shown FIGS. 8–11, whereby application of pedal or motorized movement always drives the wheels, instead two or more interacting drive gears (not shown) may be mounted so that the device operator may manipulate or control the drive to supply various gearing and/or a glide mode, E.g., eliminating constant movement of the pedals when the device is in motion.

FIG. 9 shows a detached pivoting wheel assembly, 3, the wheel axle, 4, wheel, 2, wheel drive belt lip, 9, drive belt 7, in place, as well as the axle 4 its cap or nut 26, and an axle fixation pin, 4-A. Either a shaped internal threaded cap or nut 26 (shaped to a matching cavity in the wheel assembly) or the fixation pin 4-A may be used to prevent wheel rotation.

FIGS. 14 through 18 focus on the method of providing steering to the wheels of the device. As an overview, the preferred embodiment provides for dual joy stick steering which turns both of the rear wheels. The steering linkage is actually connected only by pivoting each of the rear wheel assemblies into their operative position. Referring to FIG. 14, the steering linkage, 44, is retained in a neutral position within the inside of the cart frame (on both sides of the device) by virtue of springs 46 situated between the forward and rearward side of the steering linkage 44 and a stop or post 47 inside the frame also. First, in FIG. 14, joy sticks 17, extend upward from the cart frame through cut-out sections of the frame, and are mounted into the steering linkage, 44, a portion of which steering linkage is shaped to retain it within the cart frame 1 periphery. A portion of the steering linkage, 44, includes shaped teeth, 45, which are shown in both FIG. 14B and FIG. 17 which are positioned inside the cart frame adjacent to the pivoting wheel assembly. As shown in FIG. 14-B, the shaped teeth, 45, of the steering linkage, 44, are placed in contact with a steering gear, 13, which is mounted on a shaped portion 48, of the wheel axle, 4, and these parts come in contact only when the entire pivoting wheel assembly, 3, is pivoted into the operative position seen in cross-section in FIG. 18 showing the cart frame 1 and pivoting wheel assembly 3 in the operative position. FIG. 15 shows a detached pivoting wheel assembly with the dash lines showing the wheel axle 4 and the steering gear shown as 13, within a cavity 3-A in the pivoting wheel assembly.

FIG. 16 shows only the shaped portion, 48, of wheel axle, 4, and how the steering gear, 13, is slid around the axle, 4. Accordingly, as seen in FIG. 15, the wheel axle, 4, is passed through the pivoting wheel assembly 3, the steering gear, 13, is placed within a cavity 3-A, and the shaped portion of the axle, 48, passes through the steering gear, and then the axle is pressed upward through the pivoting wheel assembly 3 through a dowel (not shown here) and a cap or nut, 26, is placed to secure the axle in place. FIG. 18 shows the relationship of the steering linkage, 44, and how it passes through a portion of the cart frame, 1, adjacent the pivoting wheel assembly 3. The shaped teeth, 45, engage the steering gear, 13, which surrounds the axle, 4, which travels through the pivoting wheel assembly 3.

FIG. 14A shows one other portion of the steering components, which is the transverse steering strut in cross section, which has placed over it the steering strut cover/frame support, 11. Depending upon construction techniques, a part of the center frame support, 14, may also be placed over the center strut, 10, and strut cover, 11, and a single steering strut pivot bolt, 15, may pass through each of these components and be secured with a nut, 50. The transverse steering strut, 10, as shown in more detail in FIG. 14, pivots by virtue of the steering strut pivot bolt, 15, so that when the joy stick on one side of the unit is moved forward or rearward, the transverse steering strut, 10, pivots in the opposite direction on the opposite side, effectively causing both of the rear wheels to move in tandem. Also in FIG. 14, one embodiment of seat bottom, 19, is shown which may be a solid material or flexible fabric. Dashed lines passing over the steering strut cover/frame support 11 indicate that the seat bottom, 19, may also be partly cut out and continued out to the forward part of the device frame over the strut cover 11.

FIGS. 19 and 20 show a slightly different variation of the seat back and bottom of the preferred embodiment 1-A. Referring to FIG. 19 first, the seat back frame, 21 (in ghost view) has a flexible fabric, 20 (in ghost view), and a seat back pivoting support arm, 72, holds the seat back frame in the upright or operative position. In order for the user to collapse the seat back, 20, the user lifts the bottom and forward most portion of the seat back frame 21, from a cart frame receiving cavity molded in the inner aspects of each side of the cart frame, 1. Once this seat back frame, 21, is lifted out of the rearmost cavity, 61 (as seen in FIG. 19), the user lifts the seat back frame 21, and moves the forward, lower part of the seat back frame to another forward cart frame receiving cavity, 61, molded from each side of the inner aspect of the cart frame, 1.

Alternatively, and/or in addition to the seat back support arms 72, a wheel support brace, 154, of a general "U"-shape, including a transverse brace (for supplying transverse support between tandem wheel axle assemblies situated in their operative positions) may be employed to add transverse stability to the wheel axle assemblies, 3, when in their operative position as shown in FIG. 19. Said wheel support brace(s), 154, may be movably mounted to the seat frame member, 21, and moved into the support brace position shown once the seat frame member is placed in the operative position (in ghost view), and once the wheel assemblies, 3, are also in their operative position. Any suitable resilient connection or quick connect means may be employed (not shown). Also the support brace, 154, may instead be mounted to the device support frame rather than the seat frame as shown in FIG. 19.

FIG. 20 shows the seat back frame, 21, as well as the seat back, 20, in the collapsed state in which the forward and lower section of the seat back frame, 21, is received in the forward most cart frame receiving cavities, 61. Arrows show the matching rearward cart frame receiving cavities which receive the seat back frame, 21, when it is in the upright position, and in the upright position, the seat back support arms, 72, serve to hold the seat back frame in the upright or operative state.

In overall operation, as can be seen in FIG. 20, it is anticipated that all four of the pivoting wheel assemblies, when stored, will overlay the seat frame, 21, so that to utilize the collapsed product, the user would first pivot out all four wheels to their operative positions, and thereafter lift and reposition the seat back frame, 21, to its operative or upright position in the rear most cavities, 61, although alternatively two or more pivoting wheel assemblies may instead pivot 90 degrees to the collapsed position.

Figure 21:
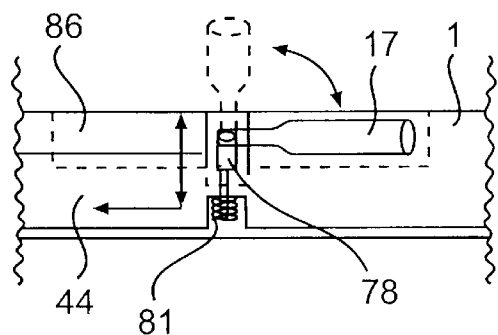
FIG. 21 is a transverse cross-sectional simplified view of the joy stick; and steering components of FIG. 2 and FIG. 14.
Figure 22:
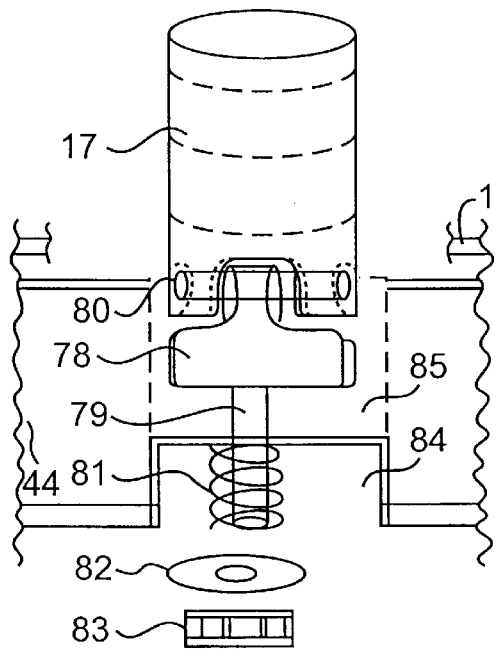
FIG. 22 is a side elevational exploded perspective of the joy stick and steering components of FIGS. 14 and 21.
Figure 23:
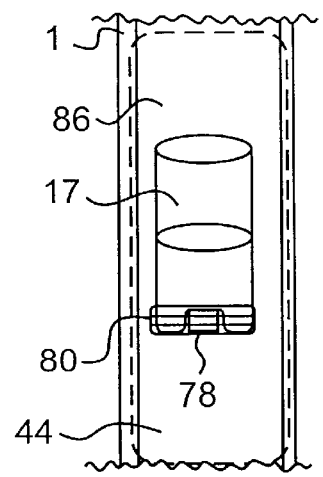
FIG. 23 is a top plan view, partially broken away, of the joy stick and the cart frame embodiment from FIGS. 21 and 22.

FIGS. 21–23 address the joy stick steering mechanism. Generally, referring to FIG. 21, the joy stick, 17, is pivoted 90" in a recessed position generally flush with cart frame, 1. Dashed lines show the joy stick handle, 17, in the upright position at which time the entire mechanism is pulled in a downward direction by the spring, 81. An exploded view of all of the joy stick parts is shown in FIG. 22 where joy stick handle, 17, is joined to a joy stick base, 78, by a joy stick pin, 80. A shaped, or preferably round joy stick base bolt, 79, passes through a matching opening through the steering linkage, 44, where a spring, 81, is placed, and then the joy stick base bolt, 79, is closed off with a washer, 82, and nut or cap, 83. The spring, 81, washer, 82, and cap, 83, all fit within the steering linkage underside recess, 84, so that the steering linkage, 44, may travel freely a limited distance both forward and backward within the cart frame, 1, without this nut or cap contacting the bottom edge of the frame, 1. FIG. 23 is a top plan view looking down at the cart frame, 1, and the collapsed joy stick handle, 17, which is situated within a cart frame cavity cutout, 86. Also the pin 80 which connects the joy stick handle and the joy stick base, 78, is partly seen. The cutout area of the frame, 86, assists in not only allowing the joy stick to pivot to the storage position shown in FIG. 23, but when the joy stick handle 17 is erected and operative, the cart frame cutout section, 86, also allows the joy stick and linkage 44, to move forward and backward without contacting the cart frame, 1. In operation, when the joy stick is pivoted up to the operative position, the spring, 81, as shown in FIGS. 21 and 22 pulls in a downward direction on the joy stick base, keeping the joy stick firmly and resiliently in the upright position so that it does not pivot downward while the user of the cycle is manipulating the steering joy stick, 17. To collapse the joy stick, the user lifts straight upward on the joy stick to a point where the pin, 80, is slightly above the level of the steering linkage 44, and this allows the joy stick handle, 17, to be pivoted 90° into the recessed position as shown in FIG. 23.

Figure 25:
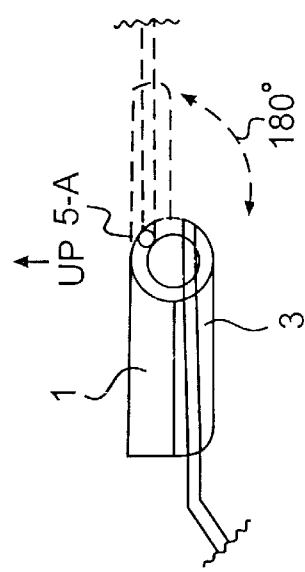
FIG. 25 is a transverse, side elevational cross-section, simplified view of the forward most pivoting wheel assembly of FIG. 24.
Figure 24:
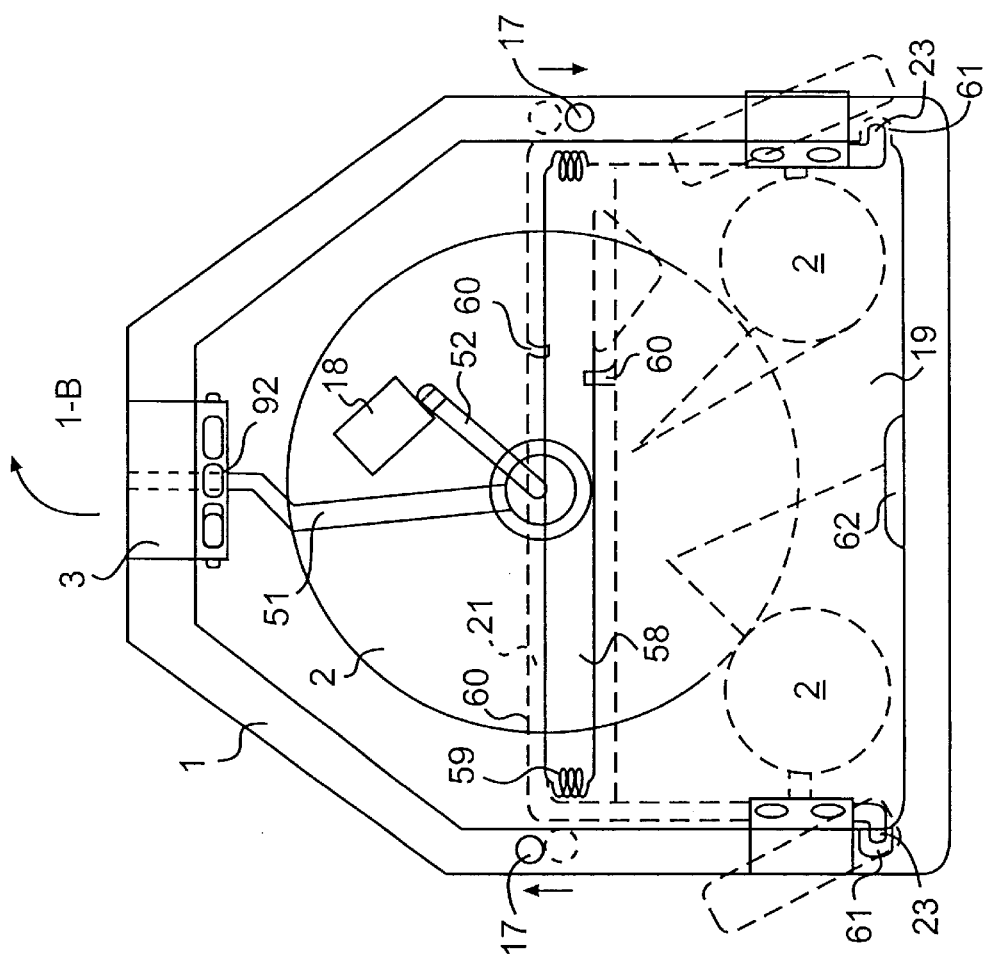
FIG. 24 is a top plan view of the collapsed three-wheel cart embodiment.
Figure 26:
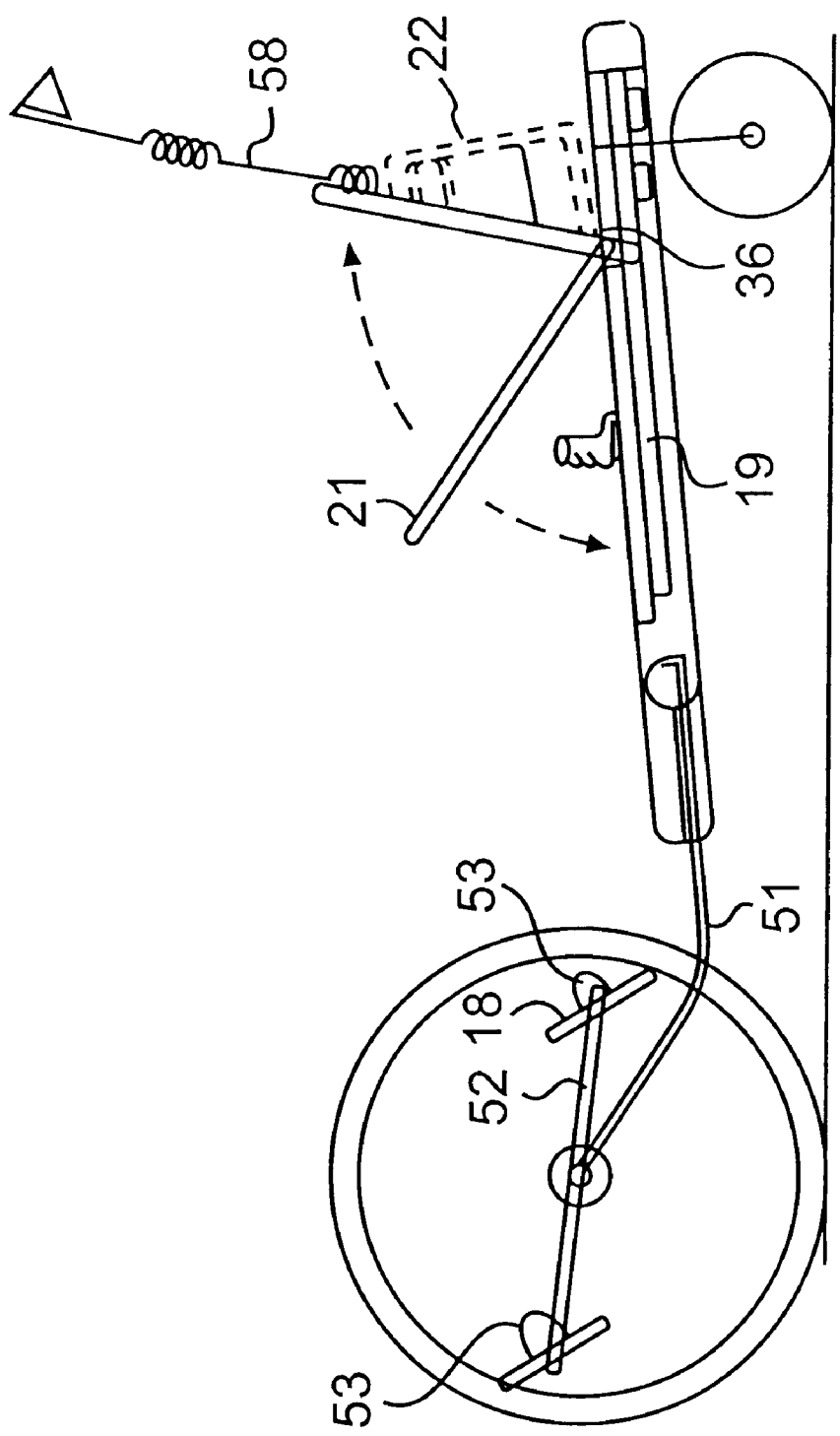
FIG. 26 is a side elevational view of an embodiment of the three-wheel cart of FIG. 24.

FIGS. 24–26 relate to a second preferred embodiment denoted 1-B in FIG. 24 which generally discloses a three-wheel device, with only one forward wheel, which shows forward wheel, 2 pivoted 180° to the stored position shown. The rear wheels, 2, shown in dashed lines in the stored position are constructed similar to those disclosed for preferred embodiment 1-A. Generally, the rear wheel steering linkage is also the same as is disclosed in the first preferred embodiment 1-A, including the joy stick steering arrangement, although certain portions of that arrangement are omitted from the simplified illustration of FIG. 24. FIG. 24 does show how pushing the left side joy stick forward and the right side joy stick rearward turns the cycle in a right turn and dashed lines indicate the motion of the rear wheels, 2. Referring to FIG. 26 the side elevational profile shows the front wheel in the operative position which wheel may include a single-sided (or as not shown, a double-sided) axle, 51, which is similar to a fork on a traditional bicycle. Two pedal posts, 52, turn from inside the hub of the forward wheel and terminate with pedals, 18.

Referring to all three figures, beginning with FIG. 24, the forward pivoting wheel assembly is mounted in a slightly different way from the preferred embodiment of 1-A, that is, as is shown in FIG. 25, the forward pivoting wheel assembly pivots 180° from the operative position to the stored position and adopts all other aspects of the pivoting wheel axle assembly 3 shown elsewhere. Referring to FIG. 25, when the forward pivoting wheel assembly, 3, is in the forward or operative position, access to the finger latch access recesses, 6 (not shown), would be from the underside unless there are other pass-through holes in the top of the frame, 1, but in any case, the pivot motion is 180° where the pivoting wheel also positively latches in the stored position when a finger latch locking protrusion, 5-A, is freed and then resiliently presses into a corresponding cavity in the cart frame wall which is not shown in FIG. 25. Referring to FIG. 26, a seat back 21 is shown in the stored position and the arrows and ghost view indicate how the seat back moves to the operative position and rearward movement is prevented by the seat back frame stop, 36. As disclosed earlier, a mesh storage bag, 22, may be interfitted or fixed in any customary way to the seat back, 21. Also, a hideaway folding safety flag, 58, is disclosed in connection with this embodiment, 1-B, although it may be employed on any of the embodiments of this application.

Referring to FIG. 24, a flag is mounted to any suitable portion of the rear or interior of the seat back frame, 21, with a spring closest to its base, a suitable length of the staff, 58, followed by a second spring portion, another suitable staff and a flag of any customary type. A series of small protrusions are placed along portions of the rear of the seat back to allow for portions of the hideaway flag to fit along the seat back frame as shown in FIG. 24. Alternatively, the springs of flag 58 may instead be pivoting hinged portions of the flag staff, such that when the flag is completely pivoted into the fully erect position (see FIG. 26) the hinged joints resiliently maintain the flag in the erected position (not shown).

As seen in FIG. 26, once the seat back, 21, is pivoted upward to the operative position, the user simply lifts the hideaway flag carefully off its notches or protrusions to free it, at which time release of the springs allow it to straighten upward, away from the ground as shown in FIG. 26. Also referring to FIG. 24, the seat bottom, 19, is shown which may be any suitable base material but may preferably be a flexible fabric and the seat back frame, 21, is shown in dashed lines in the collapsed position over the seat bottom, 19. Also in FIG. 24, the forward wheel is shown in the recessed stored position, and when it is pivoted outward to the operative position, the wheel, 2, is pivoted from the cart frame periphery 180° as shown in FIG. 26. As shown in FIG. 24, a user-selectable shaped cam or cam/washer, 92, is selectably moved by the user to allow for a second pivot of 90°—this pivot is of the wheel and its axle but not of the entire wheel assembly (details not shown here). Finally, a space or opening in the seat bottom, 19, also allows for a user hand hold, 62, at the rear portion of the three-wheeled cart.

Figure 28:
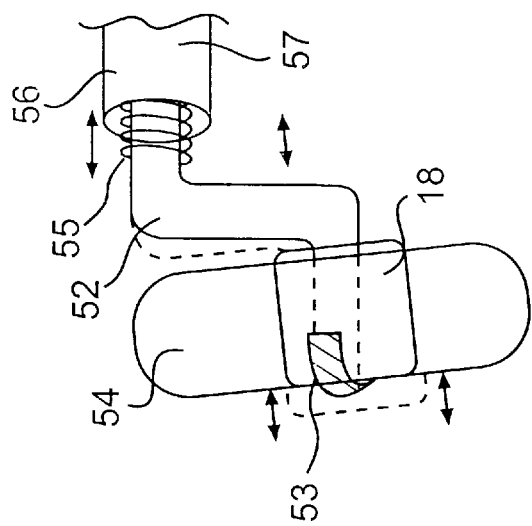
FIG. 28 is a partly detached perspective of the gear shift pedal of FIG. 26, including a simulated foot or shoe.
Figure 27:
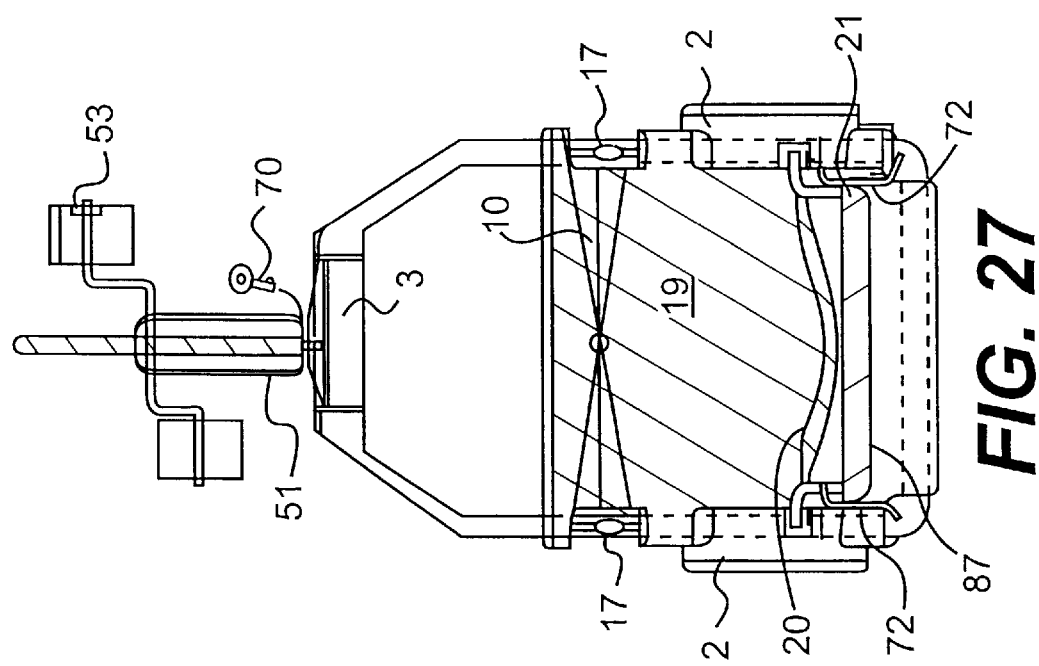
FIG. 27 is a top plan view of the embodiment of FIG. 24 showing certain other details.
Figure 31:
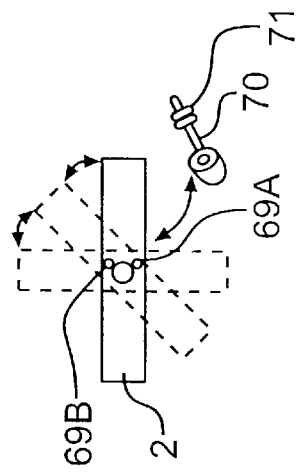
FIG. 31 is a simplified motion perspective of the pivoting fork assembly of FIG. 27.
Figure 30:
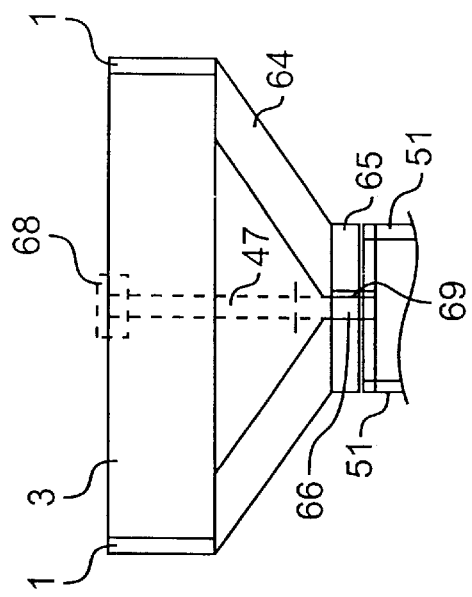
FIG. 30 is a top plan view, partially broken away, of the forward wheel fork of the embodiment of FIG. 27.

FIGS. 27 and 28 show further details of the three-wheeled embodiment 1-B, notably adding a different front fork in FIG. 27, and in FIG. 28 showing disclosure of a method for a gear shifter incorporated into the pedal and wheel hub. Referring to FIG. 27, the forward wheel utilizes a pivoting wheel assembly, 3, but a different method for fixating and pivoting the forward wheel into the operative position shown, which details are shown in FIGS. 30 and 31. In FIG. 27, the seat bottom, 19, encompasses more than half of the inner perimeter of the cart frame and partly overlays the transverse steering strut, 10, shown in dashed lines. Joy sticks, 17, have limited, yet adequate forward/rear movement, and are not impinged by any portion of the seat bottom, 19. The rear wheels, 2, are in their operative position. The seat back frame, 21, is show in its operative position with a flexible seat back, 20, stretching within the frame, 21. Not clearly seen at the uppermost portion of the seat frame is a rounded upper frame section or "roll bar" seat back frame segment which may simulate more of a go cart type "roll bar" at its uppermost section. As shown in subsequent FIG. 32 more clearly, two seat back support arms, 72, serve to lock the seat back frame, 21, in the upright or operative position.

Referring to FIG. 27 further, the rear two wheels, 2, are the turning or steering wheels, and the forward wheel is designed to be a fixed position wheel. Also the pivoting wheel assembly, 3, shown in FIG. 27 has a fork-like forward wheel arrangement 51, and the fork and forward wheel 2 may be pivoted 90° by selectively releasing and then applying a pin, 70, shown in FIG. 27.

In FIG. 28, the forward wheel internal hub 56 includes a friction brake (not shown) and also incorporated into the hub may be a multiple internal gearing system, 57 (not shown), which may be constructed in a fashion already known in the art. However, this particular pedal post, 52, is provided with a special spring actuation gear system, 55, so that when a cyclist's foot, 54, is placed on top of the pedal, 18, and the cyclist firmly pushes against a pedal foot notch, 53, in a direction outward from the internal hub 56, this motion causes the pedal post, 52, to be pulled outward which effect the changing of gears within the internal hub, 57 to allow for faster or slower pedaling as may be the case. In this fashion, the forward wheel shown in FIG. 27 may incorporate not only a forward pedal motion, a glide motion, a rearward friction brake motion, but also an outward motion on the pedal which serves to successively change the gears mounted in the internal hub 56.

Figure 29:
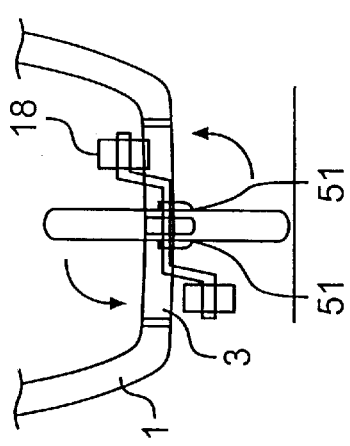
FIG. 29 is an end elevational view of the pedals and forward wheel of the embodiment of FIG. 27.

FIGS. 29–31 show detail of the forward wheel fork and pivoting motion which allow the wheel and fork to be pivoted 90°, and then the entire wheel assembly 3 is pivoted 180° under (or, alternatively, but not shown here, over) and into the side elevational profile of the cart frame. Referring to FIG. 29, the fork-style wheel axles for the forward wheels are shown at 51. Further detail is shown at FIG. 30, where the pivoting wheel assembly, 3, is shown mounted to the cart frame, 1, including the tire fork connector brace, 64, the tire fork connector brace plate, 65, tire fork support bolt, 66, which interconnects with the fork-style wheel axle, 51, previously described. Additionally, FIG. 30 shows a fork pivot pin cavity 69 which receives the fork pin, 70 (not shown here), previously discussed. The pin 70 may be selectively removed and the fork-style axle, 51, and wheel may be pivoted 90° so that the wheel is turned into the plane which allows this forward wheel to pivot within the side elevational profile of the cart frame, as shown in other figures. FIG. 31 shows the motion of the forward wheel, 2, being pivoted, and shows the two fork pivot pin cavities, 69-A and 69-B, which receive the fork pivot pin, 70, allowing for two or more user selectable fixation positions, and depending upon construction, a fork pivot pin spring, 71 may be employed.

Figure 32:
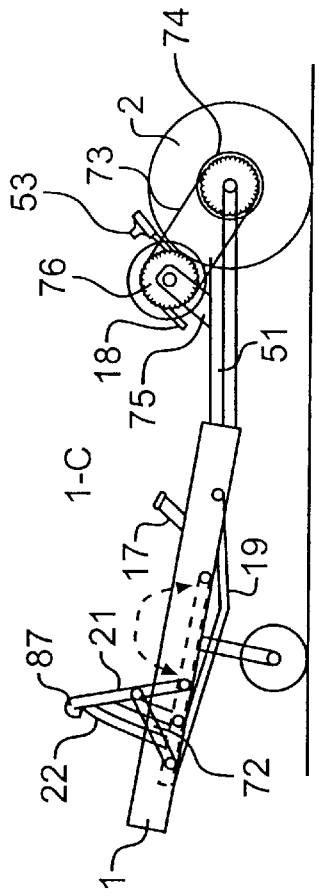
FIG. 32 is a side elevational view of an alternative embodiment of the three-wheel cart.

FIG. 32 is a variation embodiment of a three-wheeled cart denoted as 1-C, but which is largely similar to 1-B. The key difference in 1-C is that rather than a single forward wheel which incorporates a fork-like axle and two pedal posts, this particular embodiment of FIG. 32 includes an off-set pedal chain sprocket, 76, which is mounted on an off-set pedal sprocket brace, 75, affixed to the forward fork axle, 51. In this embodiment, the pedal post and pedals are mounted to the off-set pedal chain sprocket, 76, around which a drive chain, 73, is mounted, which also is mounted on a tire chain sprocket, 74, which is on the forward wheel, which wheel is the ground contact wheel. The operator of this wheeled device naturally applies pressure to the pedals, 18, which may include a pedal foot notch, 53, which may actuate the changing of gears and the actual gearing may be incorporated into the internal hub of the forward wheel, 2, which contacts the ground, or inside the offset pedal sprocket. Also, in FIG. 32 is shown a method of a seat back construction whereby the seat back frame, 21, is supported when upright by seat back support arms, one of which is shown at 72. As discussed elsewhere, lifting on the lowest portion of seat back frame, 21, and then lifting and pulling forward the seat back frame allows for the seat back frame to occupy a flush profile within the side elevational profile of the overall cart frame 1. A seat bottom, 19, is shown which may be constructed of any suitable material or fabric.

Figure 33:
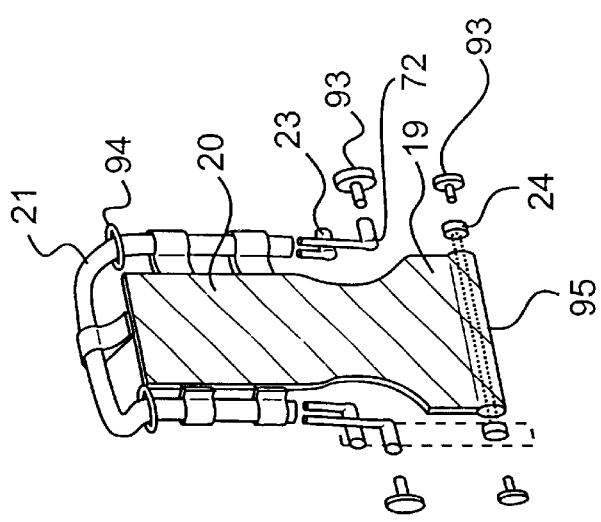
FIG. 33 is a detached perspective of an alternative embodiment of the seat of FIG. 6.

Referring to FIG. 33 is shown an alternative embodiment of the seat back and seat bottom construction which provides a very simple way for same to be connected to the cart device, and also allows for it to be easily moved forward to reposition same, depending upon the size of the user of the device. More particularly, in FIG. 33, flexible fabric for the seat back and bottom is shown at 19 and 20 as the seat back and bottom is merged into a single constructed material. The material is looped around the seat back frame, 21, and this may be accomplished by closed loop, snaps, Velcro, or the like. Also, the seat back frame, 21, is equipped with one or more seat back storage retention protrusions, 94, which are designed to hold the seat back firmly within the profile of the cart frame when the seat back is in the storage position (not shown here). As disclosed elsewhere, the seat back frame, 21, has cart frame connectors, 23, and also has pivoting connected support arms, 72, one of which is identified in FIG. 33. The seat back frame connectors, 23, are resiliently placed in matching cavities in the cart frame, 1 (not shown here), while the support arm is received in a matching cavity in the inner aspect of the cart frame, 1 (not shown), and is fixed in position by a bolt which passes through a hole in the cart frame (not shown). Further, the seat bottom fabric, 19, is held into the inner aspect of the cart frame, 1, by seat bottom frame connectors, 24, which are also held in place by a suitable bolt which passes through a cavity through the cart frame (cart frame not shown). Inside any suitable portion or portions of the seat bottom may be areas enclosing chain, wire rope or a rigidity member, 95, which is enclosed inside the fabric or material as shown. A dashed line elongated box area in FIG. 33 outlines the position of an optional seat bottom frame member, 96, which is placed on both sides of the seat bottom area as shown for one side in FIG. 34. The purpose of the optional seat bottom frame member is to provide that the seat bottom and seat back unit may be easily manipulated by the user along the inner aspect of the cart frame, 1 (not shown), to adjust it inside any shape or type of support track discussed below.

Figure 35:
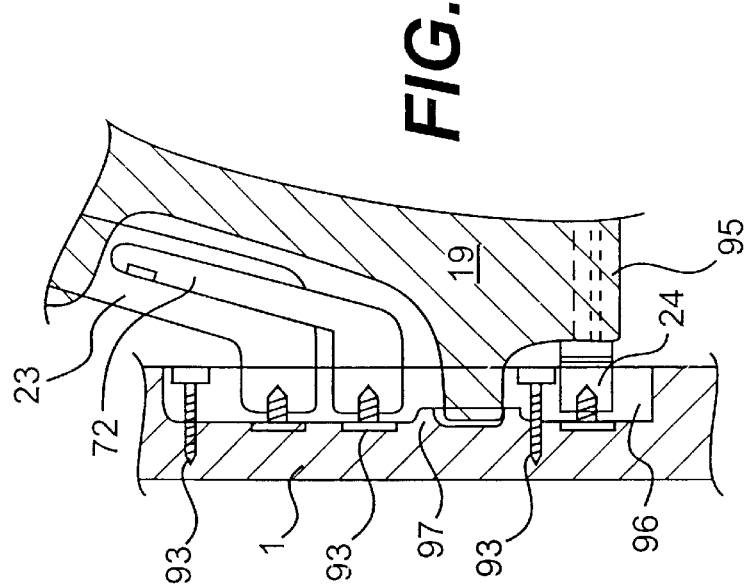
FIG. 35 is a top plan view, partially broken away, of seat bottom frame member of FIG. 33.
Figure 34:
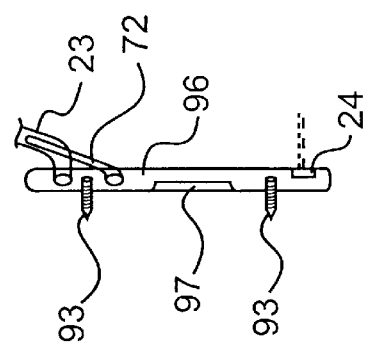
FIG. 34 is a simplified broken away perspective of the seat frame member shown in FIG. 33 (area indicated in ghost perspective in FIG. 33)

Referring to both FIGS. 34 and 35 is shown the seat bottom frame member, 96, which may be made of any suitable material or metal and this receives (in matching cavities) the seat back frame connector, 23, the support arm of the seat back, 72, and also includes a flexible fabric receiving cutout, 97, which is designed to allow the flexible fabric or material of the seat bottom to loop around this area before the seat bottom frame member is placed within the inner aspect of the cart frame, 1 (not shown). The seat bottom frame member, 96, may be affixed into the inner aspect of the cart frame by bolts, 93, although alternatively, bolts may be eliminated and instead this frame member may be slidably moveable along the inner aspects of the cart frame by any retention method available allowing for quick and simple movement by the user, such as a user manipulated shaped head or cam system which tightens and loosens to allow the seat to be slid into a suitable position, which would eliminate detaching parts or separable bolts.

FIG. 35 shows a different aspect of the seat bottom frame member and how it is received into the cart frame, 1. All of the same components described in FIG. 34 are similarly shown interfit into the seat bottom frame member, which is then received into the inner aspect of the cart frame and also included in FIG. 35 is a view of the seat bottom fabric, 19, and how it is looped into the flexible fabric receiving cutout, 97.

Figure 36:
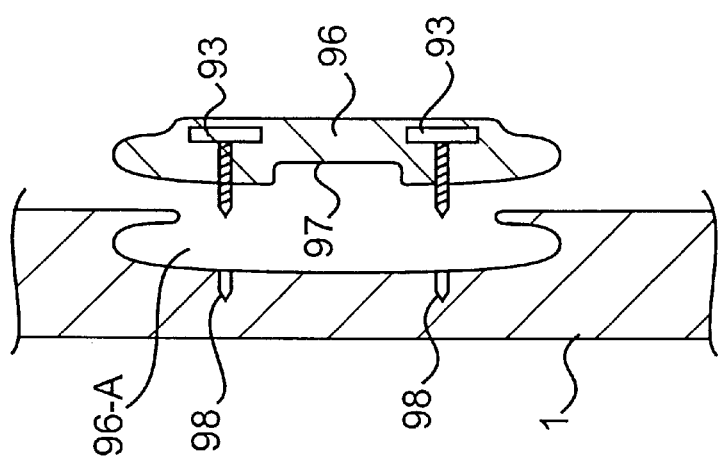
FIG. 36 is an end view, cross section, simplified perspective of the seat frame member of FIG. 34.

In FIG. 36, a cross-section view is shown of the same seat bottom frame member, 96, situated just beside a matching recessed area, where a cart frame receiving track, 96-A, is shown. Accordingly, the entire seat bottom frame member, 96, is slid into the cart frame receiving track, 96-A, and one or more screws, 93, may then be secured into one or more threaded cavities, 98, and when the user desires to move the seat back and bottom forward or toward the rear, the user loosens the screws 93, slides the unit, and then re-secures the unit in other matching threaded screw holes, 98 (not shown). As previously mentioned, rather than screws, any suitable retention method for the seat bottom frame member 96 may be employed, including quick release type latching means which are pivoted open (such as the pivoting shaped cam 114 shown in FIG. 50), the unit is slid, and then the same quick release member is pivoted and re-secures the unit (not shown).

Figure 37:
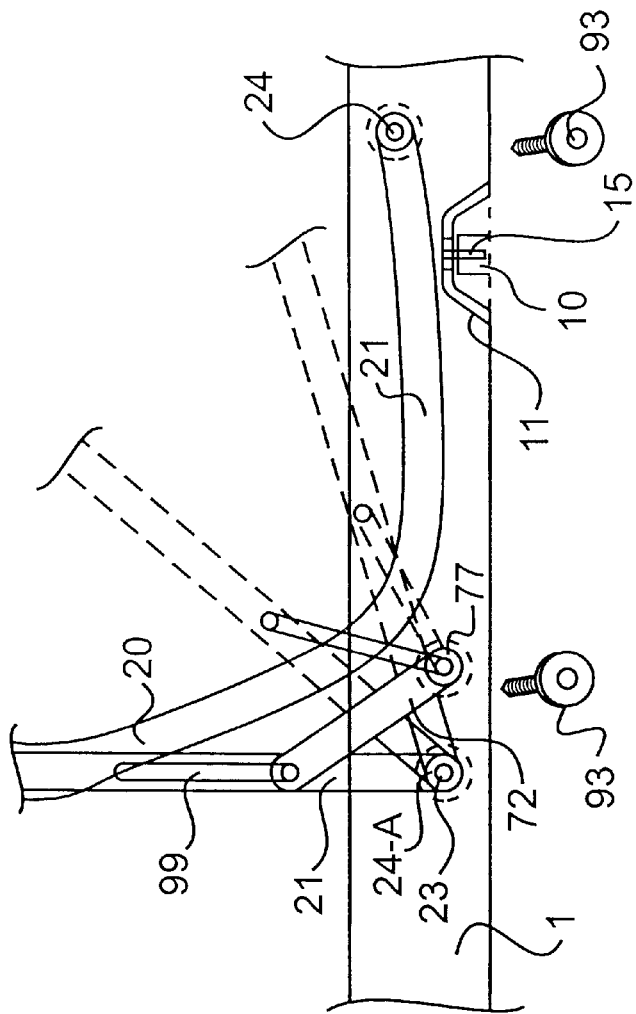
FIG. 37 is a side elevational view of the seat frame member of FIG. 33.

FIG. 37 shows the same unit (omitting the frame member and frame receiving track) and the figure is designed to show that the seat unit pivots for storage flush inside the side elevational profile of the device. The seat back frame connector, 23, and support arm, 72, each fit into matching cavities, 24-A, and 77, respectively. The support arm, 72, also pivots along a seat back frame support arm slide groove, 99, which is shown within the periphery of the seat back frame, 21 (alternatively, the support arm 72, may slide along the seat bottom support member 96 in a similar groove, though not shown). The flexible fabric seat back and bottom is shown at 20 and 21, and the dashed line ghost images show movement of the seat back frame, 21, nearly collapsed down into the collapsed position within the general side elevational profile of the cart frame, 1. The view also shows the orientation of the transverse strut, 10, the steering strut cover/frame support, 11, the steering strut pivot bolt, 15, as well as one or more bolt, 93, which may be placed through the cart frame to secure the seat back and bottom unit in place, if quick release seat adjustment means are not employed. Additionally, in FIG. 37, the seat bottom frame connector, 24, is shown where it meets the cart frame receiving cavity.

Figure 38:
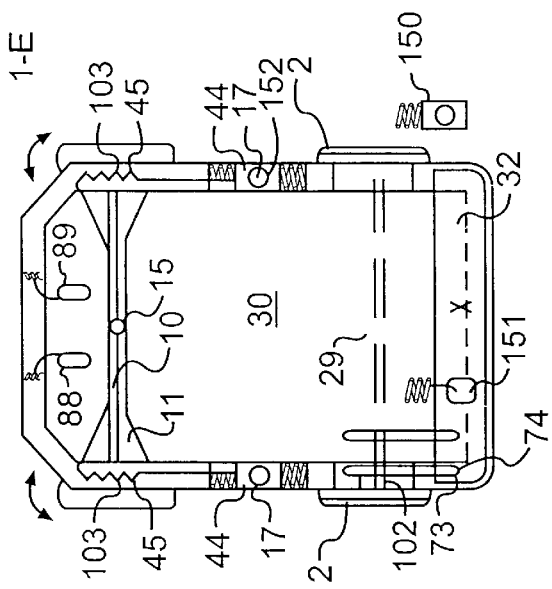
FIG. 38 is a top plan view of cart 1-D.

FIG. 38 introduces an alternative three-wheel cart device, 1-D, the notable differences in this device are that the forward wheel is the steering wheel which is controlled by the same joy stick configuration disclosed elsewhere, while the rear tandem wheels or at least one of them, provide drive or power from pedals. More particularly, the forward wheel, 2, is steered and controlled by tandem joy sticks which are configured very similarly to other figures and descriptions herein. The differences involve the addition of steering linkage bands 100, which travel generally inside the cart frame, 1 and its periphery through a series or multiple number of steering band guides, 101, which may be positioned not only in the front portion of the cart frame, but cables or bands may also connect or join to the steering linkage 44 through the rear of the cart frame (not shown). In the position of the forward pivoting wheel assembly, 3, and through a portion of the cart frame, 1, is passed steering linkage shaped teeth, discussed in more detail elsewhere, which interact with a steering gear, 13, also described elsewhere. The connection between the gear and the shaped teeth 45 is only effected when the pivoting wheel assembly, 3, is in the operative position. It is noted that the general forward wheel steering arrangement shown may be reversed and the pivoting wheel assembly may pivot from the operative position to the storage position either 270° or 90° as may be appropriate. It is further understood that although a single forward wheel is shown adopting this steering linkage method, instead there may be two forward wheels mounted in the front end of the cart frame, or two wheels in tandem, each mounted on the front end of the side frame in the more traditional fashion (not shown). The movement of the joy stick, 17, and the associated steering linkage causes the forward wheel or wheels to turn. As discussed here, and in the previous patent application of co-inventor Shapiro, Ser. No. 09/604,769, once the forward pivoting wheel assembly is to be collapsed for storage, any suitable cam or other locking method may allow for pivot of the forward wheel axle 90 degrees in relation to the cart frame pivoting wheel assembly, and then the entire cart frame wheel axle assembly may be pivoted 90° or 270° so it stores within the general side elevational profile of the cart device.

Figure 39:
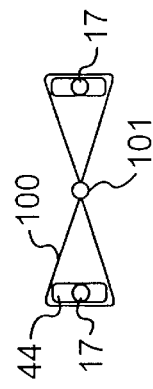
FIG. 39 is a side elevational profile of the drive mechanism of cart 1-D of FIG. 38.

There are new elements of the drive system in device 1-D shown in FIGS. 38 and 39 also. A drive axle which incorporates pedals is shown at 29, and the ends of the drive axle are shaped to interfit into a chain or drive sprocket, 74, preferably mounted within the periphery of the cart frame 1, which is shown in more detail in FIG. 39. Around the chain or drive sprocket, 74, travels drive chain, 73, which then terminates at the opposite end around stub drive axle and sprocket, 102, shown in FIG. 39. The entire drive chain is preferably incorporated into one or both of the side walls of the cart frame, 1. Access to the chain may be effected by any suitable cutout portion of the cart frame which may be screwed in or slid in so access can be had to place or access the chain at any time.

The stub drive axle and sprocket, 102, shown in FIG. 39 may be of any suitable shape; however, the drive axle nose is shaped and has a fixed position, and when the pivoting wheel assembly, 3 (not shown), is pivoted into the operative position, the drive gear, 8, is forced into linkage. Any suitable belt or chain, 7, travels around the aforesaid gear, 8, which is connected to the wheel in the fashion described earlier in this application.

Figure 40:
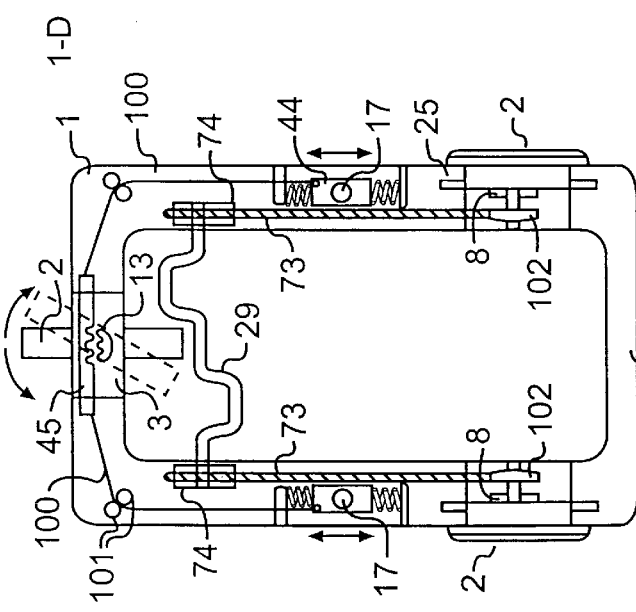
FIG. 40 is a top plan view of cart 1-E.

FIG. 40 also introduces another four-wheel cart device, denoted 1-E. The notable difference in this device is that it also provides for forward steering wheels and rear-mounted drive wheel or wheels. The basic design does not include pedal power, but instead motor, fuel cell or battery power which is mounted preferably in the rear at 32 (although may be mounted anywhere suitable, not shown). It is understood that the motor or battery may be incorporated into the cart frame in whole or part, or may be shaped along the rear cart frame so as to entirely or nearly fit within the side elevational profile of the cart frame periphery, 1, or mounted at any suitable position on the base. In FIG. 40 is shown a typical brake pedal, 88, which may be connected to a friction brake (not shown) and an accelerator pedal 89, which may be connected to the motor or battery, 32, in any conventional method, although it is assumed that the cord or cables will be run inside the cart frame, 1, periphery. Joy stick, 17, controls the steering, and the steering linkage, 44, is mounted within the cart frame periphery as discussed elsewhere. The steering linkage, 44, travels forward until it passes adjacent to the forward pivoting wheel assemblies where the steering linkage shaped teeth 45 interact with the steering gear, 13 (not shown), as discussed elsewhere in the application. Notably, depending upon the desired steering method by which the joy stick movement should turn the forward wheels, an additional second reciprocating gear, 103, may be mounted adjacent to, above, or below the previously-described steering gear, 13, so as to accomplish the directional movement of the wheel desired. Also, the transverse strut, 10, strut cover and support, 11, and the pivot bolt, 15, are shown at the forward portion of the cart device and may be incorporated within a rigid or solid base member, so it is not seen by the user, and may again be incorporated at any forward or rearward portion of the cart device base, 104, including above or below same. Alternatively, as seen in FIG. 4, a collapsing traditional steering column 91 (not shown here) may be mounted to the transverse strut 10, in a manner that would eliminate the steering sticks 17. The motor or battery 32 includes any suitable connection to a drive chain, 73, which is mounted on a chain or belt sprocket, 74, which then travels around a stub drive axle and sprocket, 102, as shown in FIG. 40, although no detail is included. It is understood that the stub drive axle and sprocket, 102, may be mounted entirely within the cart frame periphery as shown in FIG. 40, or the stub drive axle may instead encompass an axle which travels across the device to the opposite rear wheel as shown in dashed lines indicated at 29. This drive axle may travel under or inside of a rigid cart base and may alternatively travel under a flexible fabric seat bottom or seat base (omitted from FIG. 40 for simplicity of illustration). Also, the drive chain, 73, is shown completely incorporated into the cart frame periphery, but as shown in adjacent dashed lines the particular drive chain may instead be mounted above, within, or below the cart base, 30, as shown by dashed lines.

This device (or any of the devices disclosed herein which use motive, rather than pedal power) may be modified to provide for remote control operation. A remote control unit 150, may operate on radio or any other wireless, or infrared communication medium. Rather than be hand held as shown, any other computer based command and receiving device may be employed. The remote unit, such as 150 shown, may command both a motor drive control receiver 151, and a steering control receiver, 152, to remotely command steering and propulsion to the device. Also, equipment mounted to the wheeled device, may include but not be limited to: camera or imaging equipment, sound emitting or recording equipment, scientific measuring instruments and equipment, weather evaluating gauges or instruments, and the like, may be remotely controlled by the control and receiving unit, 150, which unit may receive data from such devices or items mounted to said wheeled devices (not shown)

Figure 41:
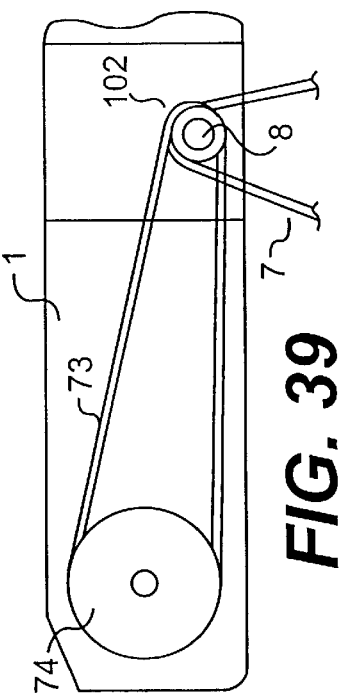
FIG. 41 is a simplified perspective of an alternative steering linkage design of the transverse steering linkage of the carts.

FIG. 41 simply illustrates another alternative embodiment of linking the bilateral steering linkages, 44, described elsewhere, for tandem steering when the user manipulates the joy sticks, 17. In this alternative embodiment, a cable or band 100 travels in a bow-tie configuration with one long continuing band or loop so that one movement of a joy stick causes a corresponding and opposite movement of the other joy stick, and the figure includes a central cable or band guide, 101, which is mounted within, over or under, the cart base, 30, or underneath a steering strut cover/frame support 11, shown throughout the application. It is also understood that instead of a continuous loop, the bow-tie shape cable 100 may be two separate cables connected to each steering linkage 44, and still accomplish the same reciprocal movement.

FIGS. 42 through 53 show features of another preferred embodiment of a three-wheel cart 1-F traditionally called a tricycle. First, referring to FIGS. 42 through 45, the primary details are shown. FIG. 42 shows a side elevational view of the tricycle and beginning at the rear, there are two rear wheels, 2, and each rear wheel is mounted on a combined wheel axle and assembly, 104. The wheel axle and assembly, 104, is held in the operative position by virtue of a cart frame mounted pivoting assembly latch, 105, which is spring-loaded, and which the user preferably presses away from the combined wheel axle assembly, 104, in order to pivot and stow the rear wheel into the storage position which is shown in FIGS. 43 and 44 within the device frame 1, which each indicate that the rear wheels may be stored in a side-by-side relationship (FIG. 43) or by being sandwiched atop each other (FIG. 44).

Referring further to FIG. 42, the tricycle notably includes a pivoting wheel assembly support cylinder, 25, which serves as the pivot point for both the forward wheel, 2, shown in the storage position in FIG. 42, but which also serves as the pivot point for collapsing steering column, 110, and its components. FIG. 42 shows by ghost perspective the general manner in which the forward wheel, 2, is pivoted 90°, the latch, 105, is manipulated, and the user then folds and pivots said wheel, 2, into the collapsed position shown in FIG. 42. Likewise, the user then presses a similar finger latch to release the steering column, 110, which allows it to pivot and fold within the side elevational profile of the tricycle as shown in FIG. 42 of the ghost perspective of the steering column.

FIG. 42 also shows that a rear step or ledge, 148, may pivot along two pivot pins, 149, connected to the cart frame, 1, and also store and recess, as shown in ghost perspective, within the side elevational device profile. Any of the tricycle designs disclosed may include such as fold-out rear step.

Further details are more clearly shown in the top plan view of FIG. 45, which shows the rear wheels, 2, in their stored position and said wheels in their operative position with ghost perspective. Also, toward the rear of frame section, 1, is shown a series of two double lines on either end, denoted AA, which simply indicates that the frame, 1, may be omitted between the two points denoted AA, thereby possibly eliminating the rear end section of the frame.

FIG. 45 shows how the steering column, 110, pivots along a pivot point near the front edge of the nose of the tricycle. In operation, the user would manipulate the upper finger latch, 105, which when pressed away from the center of the cart allows the steering column to pivot upward at a 90° angle from the tricycle frame periphery where it would lock into the upright, operative position by virtue of the finger latch, 105, securing itself into any portion of the periphery of one end of the wheel assembly support cylinder, 25 (not shown here). The steering column, 110, includes several components, including a pivoting upper steering column brace, 108, an adjustable sleeve, 113, which includes a sleeve tension adjusting cam, 114, steering column itself, 110, and the steering column handlebar sleeve, 111, within which fits handlebar end segments, 106, as well as the handlebar pivot central joint, 121. Once the steering column is pivoted 90° into the operative, upright position, the forward wheel, 2, may not be in the forward or ready-to-pedal position, and accordingly, the user may utilize the sleeve tension adjusting cam, 114, which fits around the adjustable sleeve, 113, to allow the user to manually manipulate the handlebars in relation to the wheel and then re-secure the tension adjusting cam, 114. Likewise, once the steering column is pivoted into the upright position, there are a series of one or more detents 112, which the user presses inward, and then the user turns one or both of the handlebar end segments, 106, and then pivot the handlebars 106 approximately 90° to where the detents (not shown) spring outward into a second set of recesses or cavities in the sleeve 111 which allows the handlebars to be held in the re-oriented, operative position.

Still referring to FIG. 45, the forward wheel, 2, is shown with a fork-style wheel axle, 51, as well as pedals, 18. In order to collapse the forward wheel, 2, into the ghost position shown within the cart frame 1, the user would press the release latch, 105. The user would turn the forward wheel 90°, re-orient the handlebars (described above) fold the pedals (not shown here, shown in other figures), and then pivot and fold the forward wheel upward into the general side elevational profile of the frame, 1, under the tricycle seat/base, 107. By virtue of the spring-actuated latch mechanism, 105, that forward wheel will "lock" in the stored position generally within the underside of the tricycle frame, 1. In relation to FIGS. 42 and 45, the rear wheels may be pivoted 90° to generally within the side elevational profile of the device, rather than 270° to the position overlaying the device seat/base, 107, as shown in FIG. 45.

Importantly, the folding, collapsible steering column 110, and its components, described in FIGS. 42 & 45, may be employed as an alternative forward wheel steering method in several other embodiments previously discussed, notably:

FIGS. 24 and 27 (folding steering column may be adopted in lieu of steering sticks, thus forward wheel may be steering wheel, with rear wheels fixed against steering rotation) and FIG. 38 (forward wheel would be steered with collapsing steering column 110, rather than by steering sticks 17, integrated steering linkage 44 and band 100).

FIG. 46 and FIG. 47 show two alternative methods of pivoting or folding the pedals into a general profile parallel with the forward wheel, 2. Referring first to FIG. 46, a spring-loaded method is shown whereby the user manipulates a sleeve which allows pedal, 18, to pivot 90° into a storage position parallel with the profile of the forward wheel, 2. In detail, pedal, 18, is mounted on the pedal post, 52-A, by virtue of a pedal post pivot pin, 115. The pedal post, 52-A, includes a washer, 82, and retains the pedal 18 in position by virtue of crimped protrusions, 116, fabricated on the pedal post, 52-A, and a nut or cap, 83, is placed on the opposite end of the pedal 18. On the fixed portion of the pedal post, 52, is included another protrusion, 116, a washer, 82, a spring, 59, and a pedal post sleeve, 117 which also may include protrusions adjacent the end closest to the pedal 18, which mate into recesses in the pedal post 52-A, when the pedal is in the operative position (not shown). When the user manipulates the pedal post sleeve, 117, sliding the sleeve, 117, toward the adjacent washer, 82, it allows the pedal, 18, to achieve the pivoted, recessed position shown in ghost outline in FIG. 46.

FIG. 47 is an alternative folding or collapsing pedal embodiment which shows the pedal, 18, mounted on the pivoting pedal post 52-A. Notably, in this embodiment a pedal pivot brace, 118, is included, and one end of said brace is mounted to the fixed pedal post 52 by virtue of a pivot pin, 115, at not only the fixed pedal post, 52, but also on the pivoting pedal post, 52-A. The end of the pivoting pedal post, 52-A, farthest from the cap or nut, 83, passes through a matching cavity or hole through the fixed pedal post, 52. Depending upon fabrication technique desired, a securing push or pull button, 120, may be spring-loaded on the fixed pedal post, 52, as shown, such that the user pushes a button or pulls the button; the user then pulls the pedal, 118, in the direction away from the forward wheel 2 and perpendicularly, and after the pivoting pedal post, 52-A, clears the fixed pedal post cavity within 52 (not shown), pedal 18 is pivoted along the pedal pivot brace, 118, which brace may also slide within a groove, 119, and then the pedal, 118, is shaped in any suitable fashion so that it resiliently attaches to the fixed pedal post, 52, as shown in the ghost outline perspective in FIG. 47. This tricycle design may include a suitable hitch or hook recess, 147, as shown in FIG. 45, to allow for towing or trailing of any other wheeled device. The hook recess may also allow for hanging the device from a wall or hook, and any number of such hooks may be fabricated along the device frame (not shown) of this or any other cart or tricycle device disclosed herein.

Figure 48:
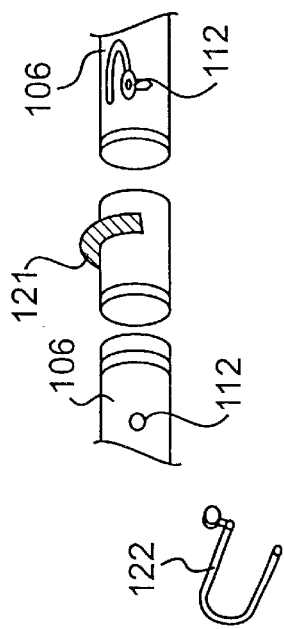
FIG. 48 is an exploded view of the handlebar parts of tricycle 1-F.

FIG. 48 shows exploded detail of the handlebar parts for cycle 1-F, which are preferably in three sections, which include matching handlebar end segments, 106, and central handlebar pivot central joint, 121. Central joint, 121, includes a suitable protruding shaped pivot stop and each of the handlebar end segments, 106, include a detent receiving recess, 112, within which a detent and u-shaped retainer, 122, are mounted, prior to when these three sections are screwed or snapped together within the steering column handlebar sleeve, 111, as shown in FIG. 49.

Figure 49:
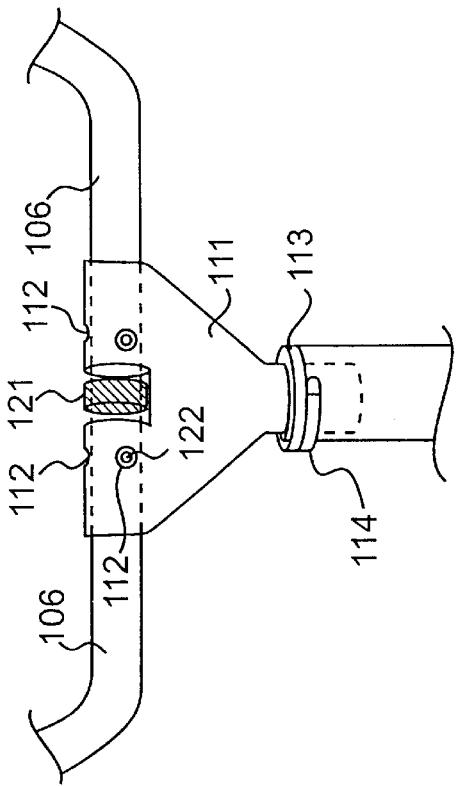
FIG. 49 is a simplified detailed perspective of the steering column and handlebar of tricycle 1-F.

FIG. 49 includes the handlebar end segments, 106, as well as the central handlebar pivot stop and joint, 121, connected and placed within a suitable opening through steering column handlebar sleeve, 111. Also FIG. 49 shows an adjustable sleeve, 113, which includes a manually manipulable sleeve tension adjusting cam, 114. The user may press the detents 122 inward to pivot and re-orient the handlebars 106 and in this re-oriented position the detents 122 press outward into another set of recesses, 112, also seen in FIG. 49.

Figure 50:
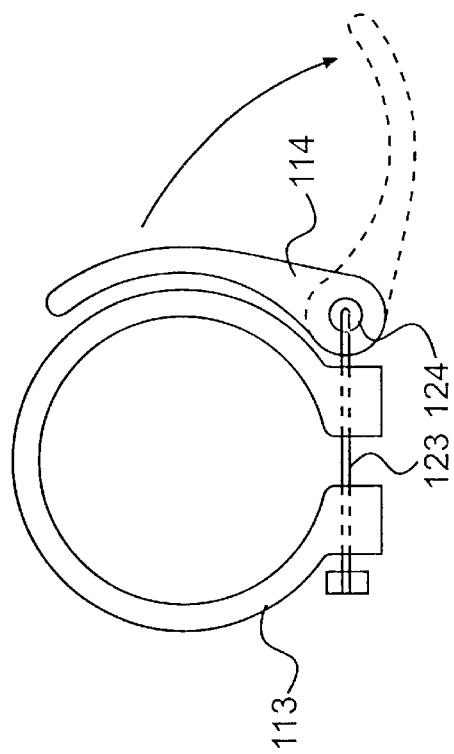
FIG. 50 is a top plan cross sectional view of an adjustable handlebar sleeve of tricycle 1-F.

FIG. 50 shows the detail of the manually manipulable sleeve tension adjusting cam, 114, and also includes a top plan view of the adjustable sleeve screw/pin, 123, which screws into a receiving nut 124.

Figure 51:
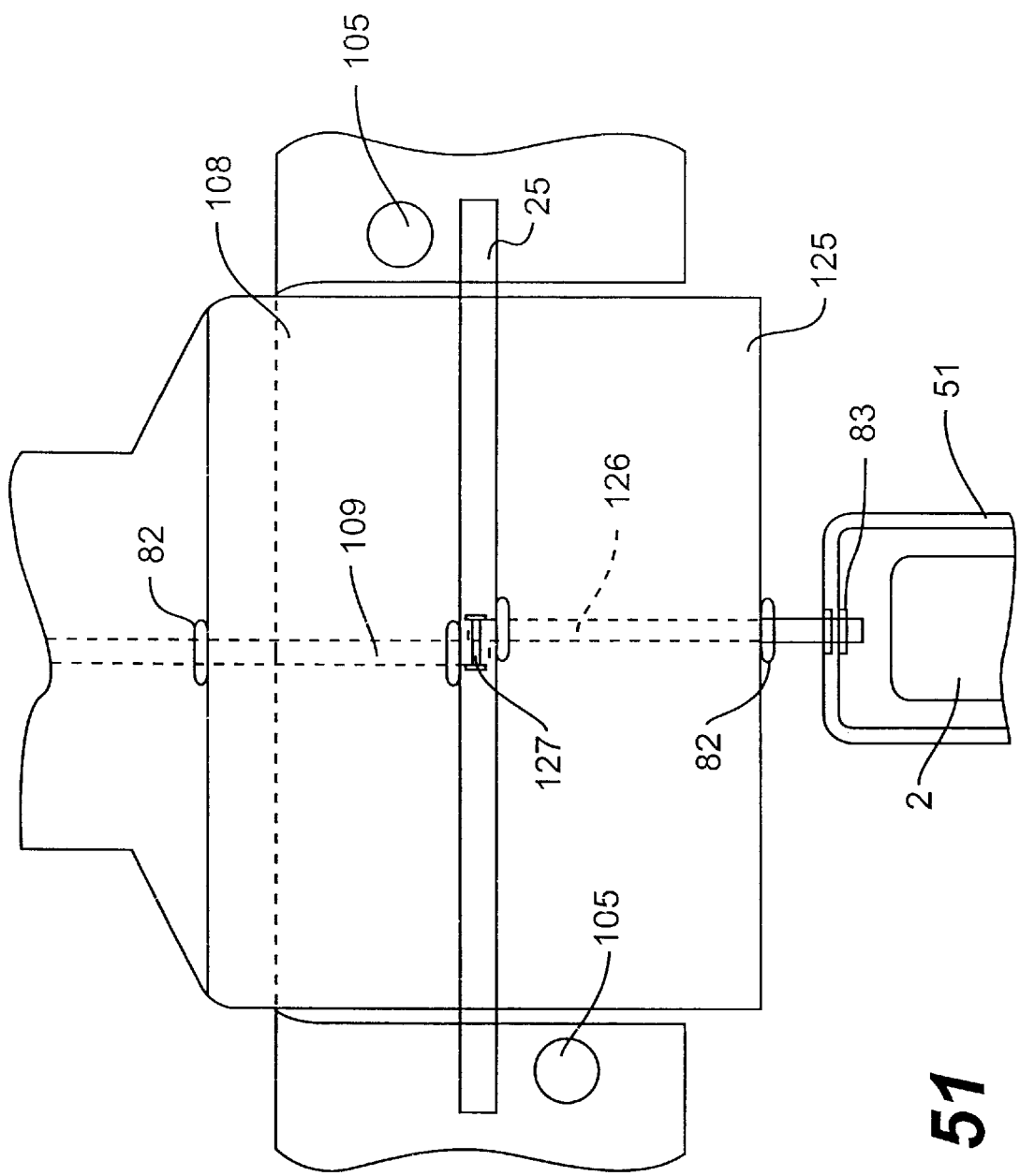
FIG. 51 is an end elevational, simplified perspective of the pivoting wheel and steering column assemblies of tricycle 1-F.

FIGS. 51 through 53 show details of both the pivoting forward wheel assembly as well as the steering column pivoting assembly which each share the same support cylinder and are hinged together.

Referring first to FIG. 51, the actual hinge detail is omitted in this simplified view which shows the lower pivoting steering column brace, 125, and a similar corresponding pivoting upper steering column brace, 108, which are mounted on the same pivoting wheel assembly support cylinder, 25. The lower steering column brace, 125, is secured and freed from the operative position by virtue of the cart frame mounted pivoting assembly latch, 105, and likewise the upper steering column brace, 108, is freed or locked by virtue of a similar upper cart frame mounted assembly latch 105. In FIG. 51, the steering column lower axle rod, 126, is connected to the fork-style wheel axle, 51, at its lowest termination point, and is also connected to the steering column upper axle rod, 109, by virtue of a central axle rod connecting pin, 127. Internal threaded washers, 82, or screw-threaded washers, 82, also secure the upper and lower axle rods, 109 and 126 respectively, on either end of the pivoting braces and assemblies, 108 and 125. These same details are also shown in similar but slightly different exploded perspective in FIG. 52. Accordingly, when the handlebars are turned, the axle rod travels through the pivoting assemblies, 108 and 125, turning the forward wheel, 2. Depending upon desired construction, FIG. 52 indicates that there may be grooves or cavities in the generally central portion of the pivoting wheel assembly support cylinder, 25, or as shown by dotted lines 129, an alternative embodiment may be constructed whereby no central portion of the cylinder, 25, is included, but instead two outer ends of cylinder, 25, are fixed to the opposite walls of the device frame 1 on which the pivoting braces and/or assemblies, 108 and 125, are mounted (not shown).

FIG. 53 simply shows a detached simplified perspective of the braces or assemblies, 108 and 125, in their storage, collapsed position, without the axle rods or other hardware shown. FIG. 53 also shows that there are cavities or recesses, 130 and 131, within which the steering rod axles are passed.

FIGS. 54 through 57 show details of an alternative tricycle embodiment, 1-G, which is also referred to as the A-frame tricycle. Similar to other carts shown herein, the rear wheels may pivot to a stored position 270°, or may pivot 90° or 180° into the plane of the rear wheel support and foot ledge, 140 (not shown).

Unlike tricycle 1-F, this particular tricycle design provides for an A-frame pivot point which allows the rear section of the tricycle to pivot and fold generally in a parallel plane with the forward wheel and handlebar section.

First, referring to FIG. 54, tricycle 1-G is shown in the completely operative position. Starting at the rear wheel section, there is a traditional rear wheel frame and foot rest/step section, 140, on which opposing rear wheels, 2, are mounted. Each of these wheels, 2, include combined wheel axle and assemblies, 104. When the user desires to fold this A-frame tricycle for storage, the user manipulates both of the cart frame mounted pivoting assembly latches, 105, to pivot and store the wheels as show more clearly in FIG. 56 in a side-by-side relationship. It is noted, but not shown in FIG. 56, that the wheels may overlie each other in whole or in part.

Figure 56:
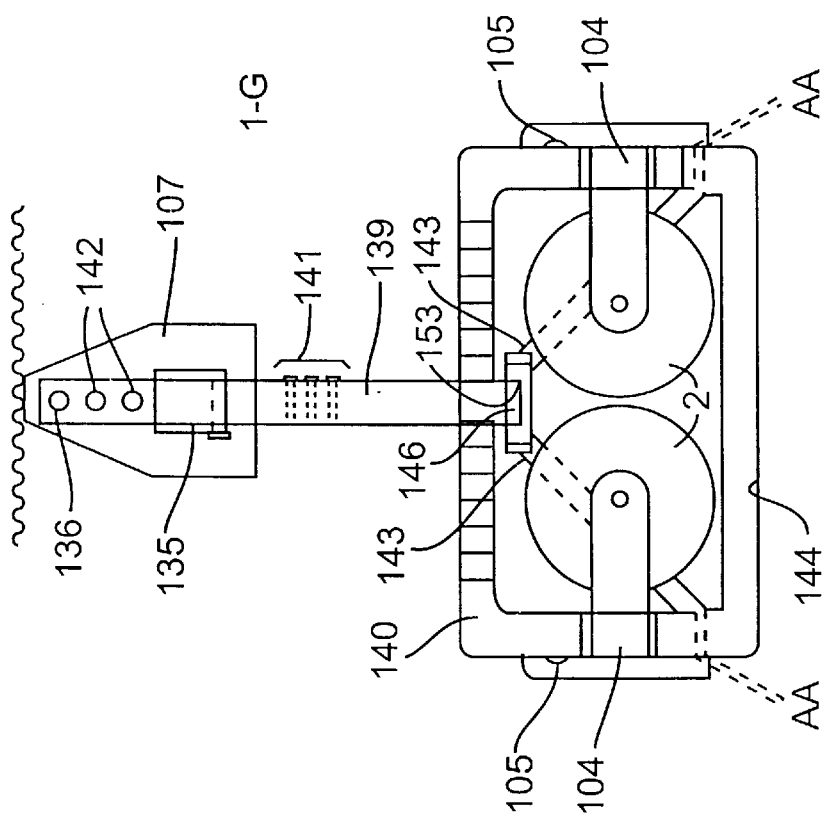
FIG. 56 is a top plan view of the tricycle 1-G with rear wheels collapsed, which includes details relating to the user-selectable movement of the seat.

Referring further to FIG. 54, the central A-frame seat support, 139, is mounted to the rear wheel frame and foot rest, 140, and a rear wheel frame pivot and/or slide and pivot joint, 146, is shown. A tricycle seat, 107, is shown which is mounted to the A-frame brace, 139, by virtue of a seat base pivoting or sliding and movable support arm, 135, at its rear, and at its forward most section includes a seat base forward retention protrusion, recess, or slide member, 136. This seat, 107, may be manipulable to multiple positions as shown in FIG. 56 where the rearmost section is manipulable in multiple positions 141, and the forward section protrusions, recesses, or slide member, 136, may interfit into multiple positions shown at 142.

Referring back to FIG. 54, a traditional handlebar, 106, is mounted at the uppermost section of the steering column (detail not shown) and pedals, 18, are also shown mounted on pedal posts, 52. The forward wheel, 2, is also shown. One of the essential elements of this embodiment is that an A-frame pivoting release pin, 138, is included as shown in FIG. 54 and discussed elsewhere. The user may turn, pull, or manipulate this particular pin, or there may be a spring-mounting assembly whereby the pivot element is pulled slightly away from the frame 139 itself in order to allow the A-frame section, 139, to pivot and fold in relation to the forward steering column. Also, this same pivot release pin 138 may concomitantly release or loosen the slidable steering column connecting collar 137, shown in FIG. 55. There is a second movable joint, 146, at the opposite end of the central support frame, 139. Also, as discussed elsewhere, a suitable opening (hitch or hook) may be created in the rear frame support, 140, or the seat, 107, (neither shown here).

FIG. 55 also shows the pivot release pin, 138, and in ghost perspective shows how the entire rear section of the tricycle pivots along that particular pivot point into a stored or recessed position whereby the rear section of the tricycle is folded into parallel relationship with the forward wheel, 2. Referring to FIG. 55, the seat base, 107, is shown in an operative position, but it may be pivoted and partly slid and pivoted by virtue of the seat base pivoting, sliding, or movable support arm, 135, to a recess or stored position shown in ghost perspective. FIG. 55 also shows that the rear wheel frame and foot rest/step section, 140, may pivot in relation to the A-frame seat brace, 139, as indicated in the ghost perspective of section 140. The pivot joint, 146, may have a resilient point at which the user simply overcomes protrusions or recesses within the rear wheel frame opening 153 to allow the A-frame brace, 139, to pivot so that the rear frame 140 is in a flat plane with the rear step in the collapsed position. The rear wheel frame and foot rest section, 140, has mounted on it opposing combined wheel axle and assemblies, 104, which connect with wheels, 2. Such assemblies may be pivoted for storage, 90°, 180° or 270° by pressing on the finger latches, 105, as discussed in other figures. The entire rear frame section, 140, may pivot 180° upward from the rolling support, operative position, or may be retained in a plane common with the central frame support, 139.

Referring to the forward pedal wheel of the tricycle shown in FIG. 55, two handlebar end segments, 106, are shown in their collapsed positions, and in ghost perspectives are shown in their operative positions aligned within the steering column handlebar sleeve, 111. The handlebars in sections 106 are retained in their operative position by detents 122 which are resiliently held in detent receiving recesses, 112. The same end segments are actually retained inside the handlebar sleeve by handlebar end segment pivot pins, 132. Alternatively, the handlebar end segments, 106, may pivot 90° upward away from the wheel (not shown). The steering column upper axle rod, 109, passes through the center of the steering column, 110, and joins to the upper section of the fork-style wheel axle, 51. Pedal posts are passed through the center of the wheel, 2, and terminate on either end with pedals, 18, which may store in a more flat or recessed position as shown and discussed elsewhere. Also, so that the rear section of this tricycle when folded along the A-frame to the pivot point, 138, may retain together in a solid closed unit, the fork-style wheel axle, 51, may include any suitable A-frame retaining members, 133, on either side, which retaining members allow for resilient connection with a matching protrusion or member mounted to the underside of the A-frame brace, 139, and which is denoted as 134 in FIG. 55. The ghost perspective shows the joinder of the underside of the A-frame brace, 139, and the retaining or protrusion member 133 mounted on the exterior of the forward wheel fork axle, 133. Last, referring to FIG. 55 is included a steering column slidable A-frame connector and collar, 137, which serves to join the steering column, 110, with the rear section of the tricycle at the A-frame pivot pin release point, 138. However, this A-frame connector, 137, also may be slidably connected to the exterior of the steering column, 110, so that when the tricycle is unfolded and set up into the operative position, this A-frame connector slides to its lowest most point on the steering column, 110, but when the user desires to store and fold the A-frame, the slidable A-frame connector, 137, may be slid or pivoted upward on the steering column and may lock in either the upward or lowermost position by virtue of any suitable locking detent or button, 145, mounted to any exterior point of the A-frame connector collar, 137, or loosened simultaneously when the pivot pin 138 is manipulated.

Referring to FIG. 56, any portion of the rear wheel frame, 140, may be rounded or flattened to allow better traction for a child's foot. Moreover, as shown in this figure, instead of a rectangular type of rear wheel frame, cross braces, 143, shown in ghost perspective may be included and in this fashion, the entire rear portion of the frame between the dashed lines denoted AA may be omitted from the design, leaving just a reverse u-shape rear wheel frame in FIG. 56.

Figure 57:
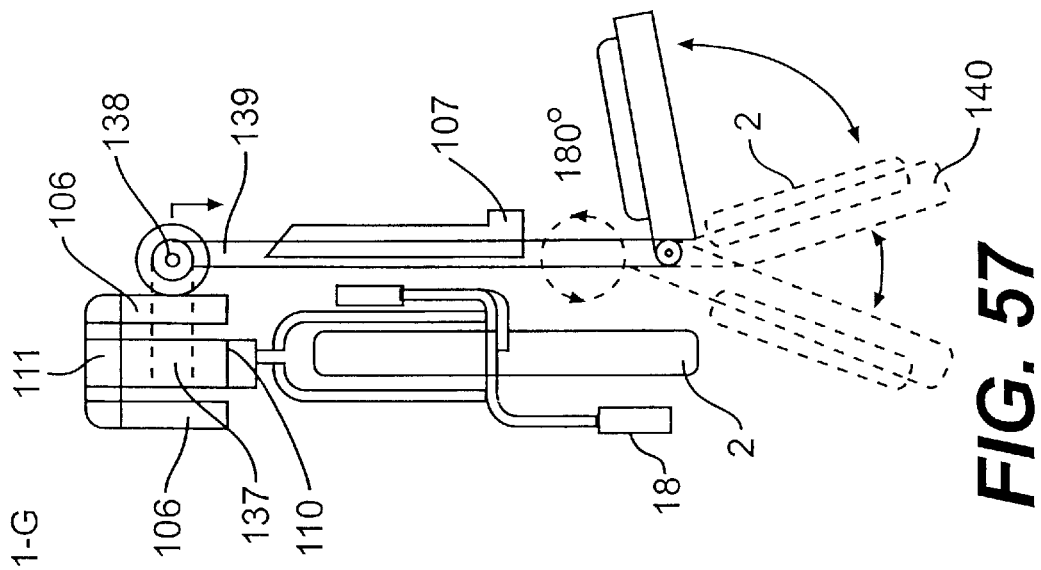
FIG. 57 is a side elevational view of the tricycle 1-G in a collapsed position with an alternative embodiment providing for 180° rotation of the A-frame section of the tricycle along the A-frame pivot axis.

FIG. 57 shows an alternative embodiment of the A-frame tricycle, 1-G, relating to the pivot joint, 138. In the previous embodiments, shown in FIGS. 54 through 56, manipulation of the pivot pin, 138, simply allowed the A-frame brace, 139, to pivot along its axis to fold in or down parallel with the front wheel, but in this embodiment, it is presumed that the pivot pin, 138, will be manipulated, allowing the joint to slightly pull away as shown by the arrow beside the pivot joint, 138, in the figure. Once the user loosens and pulls the A-frame connector, 139, in the direction shown by the arrow, the entire A-frame connector may be rotated 180° which would reverse the relationship of the stored rear wheels and the forward wheel as shown by the ghost perspective. Once the brace segment 139 is rotated 180°, it would be tightened or manipulated, thereby "locking" the rear wheel section into this relationship shown in the ghost perspective. When the user desires to unfold the tricycle, the reverse movement would be initiated.

What is claimed:

1. A wheeled device comprising:

a support frame defining a side-elevational profile and an outer perimeter;

a plurality of wheel assemblies affixed to said support frame; each of said wheel assemblies comprising a wheel having an outer periphery, defining a plane and having a central axis of rotation, and said wheel assemblies each being movable between a first, operative position wherein said wheels are erected to provide rolling support for said support frame and wherein the plane defined by each of said wheel assemblies extends substantially orthogonally to the side elevational profile of the support frame, and a second, stowed position, the plane defined by said wheels of said wheel assemblies being swept through an angle during movement of said wheel assemblies between said first and second positions such that, in the second position of said wheel assemblies, the plane defined by each of said wheels is substantially parallel with the side elevational profile of the support frame, the wheels are substantially within the side elevational profile of said support frame, and the central axis of each of said wheels is within the outer perimeter of said support frame; and at least one wheel assembly of said plurality of wheel assemblies including a propulsion transfer gear for, when rotated, producing rotation of the wheel of said at least one wheel assembly;

said device further comprising manually releasable latching means for positively latching said wheel assemblies in both of said first and second positions thereof;

user-controlled propulsion means for enabling a user to produce rotation of said propulsion transfer gear;

said propulsion transfer gear and said propulsion means being engaged in a first position thereof and being otherwise disengaged; and movement of said at least one wheel assembly to the first, operative position thereof wherein said at least one wheel assembly is latched by said latching means automatically producing relative movement between said user-controlled propulsion means and the propulsion transfer gear to said first position thereof wherein said propulsion means and said transfer gear are engaged, thereby enabling transfer of a propulsion force to the wheel of said at least one wheel assembly so as to propel said wheeled device; and when said at least one wheel assembly is latched in said second, stowed position thereof, said propulsion means and propulsion transfer gear are disengaged; and said device further comprising a support base, including at least one seat, mounted to said support frame; and a steering mechanism for steering at least one of said wheel assemblies.

2. A wheeled device according to claim 1 further comprising a propulsion shaft on which said propulsion transfer gear is mounted and a drive belt linking said propulsion transfer gear and a portion of the wheel of said at least one wheel assembly such that rotation of said propulsion shaft produces rotation of the wheel of said at least one wheel assembly.

3. A wheeled device according to claim 1 wherein said steering mechanism includes at least two steering linkages;

a strut linking said at least two linkages and including an opening therein; and a pivot pin extending through said opening in said strut and connected to a separate, fixed portion of said wheeled device so that said strut rotates about said pin and movement of one of said steering linkages is translated into movement of the other steering linkage in the opposite direction to the one steering linkage.

4. A wheeled device according to claim 1 further comprising at least one further gear linked to said propulsion transfer gear and to the wheel of said at least one wheel assembly so as to produce rotation of the wheel of said at least one wheel assembly in response to rotation of said propulsion transfer gear to thereby propel said device.

5. A wheeled device according to claim 1 wherein said propulsion means includes user operated pedals linked to said propulsion transfer gear for producing rotation thereof.

6. A wheeled device according to claim 1 wherein said propulsion means includes a propulsion shaft linked to said propulsion transfer gear and including pedals which are linked to said shaft and to which a user may apply force to propel at least one of the wheels of the device.

7. A wheeled device according to claim 1 further comprising braking means for braking movement of the wheeled device, said braking means including a rod movably connected to the support frame such that movement of the rod produces friction braking pressure between a portion of said rod and at least one wheel assembly.

8. A wheeled device according to claim 1 wherein said propulsion means includes a motor, which is linked to said propulsion transfer gear and energization of which is controlled by the user, for, when energized, producing rotation of said propulsion transfer gear.

9. A wheeled device according to claim 8 wherein the motor is controlled by a wireless remotely operated control and receiving unit.

10. A wheeled device according to claim 9 wherein the wheeled device further comprises camera-imaging and sound emitting and recording equipment, mounted on said device and controlled by said control and receiving unit, for transmitting imaging and sound signals to said unit.

11. A wheeled device according to claim 8 further comprising a receiving unit mounted on said support frame for receiving control signals from a wireless remote controlled transmitting unit providing user selectable propulsion and steering of the wheeled device.

12. A wheeled device according to claim 8 further comprising a camera image receiving and transmitting device and measuring instruments mounted on a portion of the support frame for communicating with a wireless remote controlled transmitting and receiving unit so as to provide remote user selectable camera and instrument control and for remote camera and instrument image viewing.

13. A wheeled device according to claim 8 wherein at least one wheel assembly of said wheeled device is controlled by a wireless remote controlled unit so as to control steering and propulsion of the wheeled vehicle.

14. A wheeled device according to claim 1 further comprising a fabric flag, a staff on which said flag is mounted and which comprises a plurality of staff sections connected together by a plurality of joints such that the flag and the staff sections are movable between a first, stowed position substantially flush with the side elevational profile of the support base, along a plurality of seat base retaining means and a second, erected position angularly displaced from said first position.

15. A wheeled device according to claim 14 wherein at least one of said joints includes a biasing spring for biasing the joint into a selected position.

16. A wheeled device according to claim 1 further comprising a fabric flag, a staff having a free end on which said flag is mounted, said staff comprising a plurality of staff sections connected together by a plurality of joints such that the flag and staff sections are movable between a first, stowed position wherein the flag staff is removably affixed flush with the side elevational profile of the support frame along a series of support frame retaining means and a second, erected position angularly displaced from said first position.

17. A wheeled device according to claim 16 wherein at least one of said joints includes a biasing spring for biasing the joint into a selected position.

18. A wheeled device according to claim 1 further comprising:
a seat frame member mounted on said support frame and movable between a first, operative position wherein the seat frame member is disposed out of the side elevational profile defined by said support frame and a second, stowed position wherein the seat frame member is disposed substantially within the side elevational profile of said support frame;
said support base comprising a seat member affixed to said seat frame so as to form a seat when said seat frame member is in the operative position thereof and to collapse so as to be disposed substantially within the side elevational profile of the support frame in the second, stowed position of the seat frame member.

19. A wheeled device according to claim 18 wherein the seat frame member is selectively movable and repositionable forwardly and rearwardly along at least one wall of the support frame of the wheeled device.

20. A wheeled device according to claim 18 wherein said seat frame member comprises a track and a plurality of matching, opposing, track receiving sections selectively movable and repositionable forwardly and rearwardly along said track within a side elevational profile defined by the wheeled device.

21. A wheeled device according to claim 18 wherein said seat member comprises a seat bottom and seat back and said seat member is selectively movable and repositionable forwardly and rearwardly along the support frame.

22. A wheeled device according to claim 20 further comprising a securing member mounted on at least one of the track receiving sections so as to be manually controllable to secure and release the at least one track receiving section with respect to a respective track along at least one wall of the support frame to thereby allow selective repositioning of the seat member.

23. A wheeled device according to claim 22 wherein the securing means comprises a finger controllable movable cam connected to said seat frame member, said cam being movable between a first, operative position to secure the seat frame member in place and a second, opposing manner to release said seat frame member so that the seat frame member can be selectively repositioned along the support frame of the wheeled device.

24. A wheeled device according to claim 1 wherein the support base comprises a rigid member disposed within a side elevational profile defined by the wheeled device, and a seat back comprising a rigid member movable between a first operative position wherein the seat back is disposed out of the side elevational profile of the wheeled device, and a second, stowed position wherein the seat back is disposed at least close to being within the side elevational profile of the wheeled device.

25. A wheeled device according to claim 1 wherein at least one wheel assembly includes a molded lip, and said propulsion means comprises a propulsion belt extending around said propulsion gear and said lip.

26. A wheeled device according to claim 1 wherein said support frame includes an opening therein constituting both a hitch means for trailing a rolling device and a hanging means to allow the wheeled device to be hung from a suitable mounting element when said wheeled device is in the stowed, collapsed state thereof.

27. A wheeled device according to claim 1 wherein at least one wheel assembly pivots between the operative and stowed positions thereof.

28. A wheeled device according to claim 1 further comprising:

a propulsion shaft including portions for enabling foot propelled rotation of said shaft;

at least one end of said shaft having a first rounded shape and terminating at least partly within said support frame;

at least one propulsion belt extending around said rounded shape end of said shaft and around a receiving portion, of a second rounded shape, mounted at least partly within the support frame such that propulsion of said second rounded shape receiving portion causes rotation of a stub axle gear so that a first portion thereof rotates in conjunction with said second rounded shape receiving portion;

a second portion of said stub axle including a shaped end portion located proximate to at least one wheel assembly and said at least one wheel assembly propulsion belt and linked such that foot propulsion of said shaft causes propulsion to be transferred to at least one wheel assembly when said at least one wheel assembly is moved into the first, operative position.

29. A wheeled device according to claim 1 wherein the propulsion means includes, in addition to said propulsion transfer gear, at least one interacting gear which is selectably engageable and selectably disengageable with said propulsion transfer gear to provide propulsion of the device.

30. A wheeled device comprising:

a support frame defining a side-elevational profile and an outer perimeter;

a plurality of wheel assemblies affixed to said support frame, each of the wheel assemblies comprising a wheel having an outer periphery, defining a plane and having a central axis of rotation, and each of said wheel assemblies being movable between a first, operative position wherein the wheel thereof is erected to provide rolling support for said support frame and wherein the plane defined by each of said wheel assemblies extends substantially orthogonally to the side elevational profile of the support frame, and a second, stowed position, the plane defined by said wheels of said wheel assemblies being swept through an angle during movement of said wheel assemblies between said first and second positions such that, in the second position of the wheel assemblies, the plane defined by each of said wheels is substantially parallel with the side elevational profile of the support frame, the wheels are disposed substantially within the side elevational profile of the support frame, and the central axis of each wheel is within the outer perimeter of said support frame; and at least one wheel assembly of said plurality of wheel assemblies including an axle on which the wheel of said at least one wheel assembly is mounted and mounting means for mounting said axle so as to enable axial rotation of said axle to thereby rotate the wheel of the at least one wheel assembly;

a portion of said axle including a steering gear;

at least one steering linkage device mounted on the support frame;

a user controlled steering mechanism for producing movement of said at least one steering linkage device;

manually releasable latching means for latching said wheel assemblies in both of said first and second positions thereof;

said steering gear and said at least one steering linkage device being engaged in a first position thereof and being otherwise disengaged; and movement of said at least one wheel assembly to said first, operative position thereof wherein said at least one wheel assembly is latched by said latching means automatically producing relative movement between said at least one steering linkage device and said steering gear to said first position thereof wherein said steering gear and said at least one steering linkage device are engaged, thereby enabling transfer of a user controlled steering movement to said steering linkage device to produce rotation of said steering gear and a corresponding rotational steering movement of the wheel of said at least one wheel assembly, and when said at least one wheel assembly is latched in said second, stowed position thereof, said steering gear and said at least one steering linkage are disengaged;

a support base mounted on said support frame for seating a user; and propulsion means for producing propulsion of at least one of said wheel assemblies.

31. A wheeled device according to claim 30 wherein said steering linkage device comprises at least one steering linkage connected to a controllable steering mechanism for selectively producing a steering movement of at least one wheel of at least one of said wheel assemblies.

32. A wheeled device according to claim 30 wherein said steering linkage device comprises at least one steering linkage including an erectable steering stick mounted to said steering linkage, said steering stick being selectively controllable to produce a steering movement when in a first, operative position thereof, and said steering stick being movable to a second, storage position substantially within the side elevational profile of the support frame.

33. A wheeled device according to claim 30 wherein said steering linkage device comprises at least one steering linkage including an erectable multi-part steering stick, said steering stick including an upper stick portion, a lower base portion movably connected to said steering linkage and including a hinged section connected by a pin to said upper stick portion, said upper stick section including a lowermost portion hingedly connected to said pin so as to allow the upper stick portion to move at least 90° in relation to said lower base portion of said stick.

34. A wheeled device according to claim 33 wherein the lower base portion includes a bolt extending though a portion of the steering linkage, and said wheeled device further includes a spring and terminating-fixing member affixed to the bolt of the lower base portion so as to produce a downward spring biasing force on said steering stick that causes the steering stick to be retained in a first, erected position, and such that an upwardly and then forwardly or rearwardly movement of the upper stick section permits the upper stick portion to pivot at least 90° forwardly or rearwardly along said pin so that the upper stick portion can collapse to a second, storage position along the side elevational profile of the support frame.

35. A wheeled device according to claim 32 wherein the steering stick includes means to selectively accelerate and decelerate propulsion to the wheeled device when same is motorized.

36. A wheeled device according to claim 30 wherein said steering linkage device comprises at least two steering linkages reciprocated by bands disposed within the support frame such that movement of one of the steering linkages causes reciprocating movement of a further steering linkage linked thereto.

37. A wheeled device according to claim 30 wherein at least one wheel assembly pivots between the operative and stowed positions.

38. A wheeled device according to claim 30 wherein said steering linkage device comprises at least one steering linkage maintained in a neutral position by at least one spring mounted between said linkage and a fixed surface of the support frame such that, without user-intended movement of said linkage, the linkage is retained in said neutral position.

39. A wheeled device according to claim 30 further comprising at least one support brace for the wheeled device movable from a first, stowed position at least close to being disposed within the side elevational profile of the support frame and a second, operative position wherein said support brace is angularly displaced from said first position to a location outside of the side elevational profile of said support frame, said support brace being removably mounted between at least two of said wheel assemblies when said at least two wheel assemblies are in the operative position thereof.

40. A wheeled device according to claim 39 wherein said support base includes a seat frame member movable between inoperative and operative positions, and wherein said support brace is removably mounted on the seat frame member and is movable to said second, operative position thereof when the seat frame is moved to an operative position outside of the elevational profile of the support frame.

41. A wheeled device according to claim 30 wherein said steering gear includes a washer including a shaped exterior portion linked to steering linkage device, and further including a shaped interior aspect which interfits with a portion of said axle of said at least one wheel assembly.

42. A wheeled device according to claim 30 further comprising:
   a seat frame member mounted on said support frame and movable between a first, operative position wherein the seat frame member is disposed out of the side elevational profile defined by said support frame and a second, stowed position wherein the seat frame member is disposed substantially within the side elevational profile of said support frame;
   said support base comprising a seat member affixed to said seat frame so as to form a seat when said seat frame member is in the operative position thereof and to collapse so as to be disposed substantially within the side elevational profile of the support frame in the second, stowed position of the seat frame member.

43. A wheeled device according to claim 30 wherein the steering linkage device includes at least two steering links and a cable disposed between said steering links for connecting said steering links together such that movement of one of said steering links causes opposing, reciprocating movement of a further steering link of said at least two steering links.

44. A wheeled device according to claim 30 further comprising a wheel support brace mounted on said support frame so as to be movable between a first, stowed position wherein said support brace is maintained within the side elevational profile of said support frame, and a second, operative position wherein the support frame is angularly displaced from said stowed position out of the side elevational profile of the support frame, and wherein, in said operative position, a portion of the support brace is movable to provide transverse support between two of said wheel assemblies,
   said two wheel assemblies being retained in the operative positions thereof by resilient contact between said wheel support brace and said two wheel assemblies, and
   said wheel support brace including manually releasable connection means for connecting said wheel support brace to said two wheel assemblies when said two assemblies are in the operative positions thereof.

* * * * *